United States Patent
Peart et al.

(10) Patent No.: US 8,001,054 B1
(45) Date of Patent: Aug. 16, 2011

(54) SYSTEM AND METHOD FOR GENERATING AN UNPREDICTABLE NUMBER USING A SEEDED ALGORITHM

(75) Inventors: Lee J Peart, Sussex (GB); Peter D Saunders, Salt Lake City, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 722 days.

(21) Appl. No.: 11/306,617

(22) Filed: Jan. 4, 2006

Related U.S. Application Data

(63) Continuation-in-part of application No. 10/708,545, filed on Mar. 10, 2004, which is a continuation-in-part of application No. 10/340,352, filed on Jan. 10, 2003, which is a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G06Q 99/00* (2006.01)
(52) U.S. Cl. .............................. 705/75; 705/64; 705/78
(58) Field of Classification Search ............... 705/50–79
See application file for complete search history.

(56) References Cited

U.S. PATENT DOCUMENTS

| | | | |
|---|---|---|---|
| D61,466 S | 9/1922 | Foltz | |
| 2,767,756 A | 10/1956 | Niles | |
| 3,376,661 A | 4/1968 | Hulett | |
| 3,446,260 A | 5/1969 | Osher | |
| 3,536,894 A | 10/1970 | Travioli | |
| 3,573,731 A | 4/1971 | Schwend | |
| 3,725,647 A | 4/1973 | Retzky | |
| 3,763,356 A | 10/1973 | Berler | |
| 3,829,662 A | 8/1974 | Furahashi | |
| 3,838,252 A | 9/1974 | Hynes et al. | |
| 3,873,813 A | 3/1975 | Lahr et al. | |
| 3,894,756 A | 7/1975 | Ward | |
| 3,914,762 A | 10/1975 | Klensch | |
| 3,929,177 A | 12/1975 | Reis | |

(Continued)

FOREIGN PATENT DOCUMENTS
CA     2300241     9/2000

(Continued)

OTHER PUBLICATIONS

Derfler, "How Networks Work", Bestseller Edition, 1996, Ziff-Davis Press, Emeryville, CA, all pages.*

(Continued)

*Primary Examiner* — Andrew J. Fischer
*Assistant Examiner* — Jacob C. Coppola
(74) *Attorney, Agent, or Firm* — Snell & Wilmer L.L.P.

(57) ABSTRACT

A random number generating algorithm is seeded with an unpredictable number. The seed value is computed by subjecting variable data to a Secure Hashing Algorithm, and truncating the right most, or left most, 16 bytes from the message digest generated. The algorithm generates the unpredictable number by using the seed value as a counter value in the random number generator, and performing a data encryption standard operation. In one exemplary embodiment, the unpredictable number is modified to a predetermined maximum unpredictable number value as determined by the sender and receiver of the unpredictable number.

9 Claims, 5 Drawing Sheets

U.S. PATENT DOCUMENTS

| | | |
|---|---|---|
| 3,955,295 A | 5/1976 | Mayer |
| 4,044,231 A | 8/1977 | Beck et al. |
| 4,048,737 A | 9/1977 | McDermott |
| 4,056,139 A | 11/1977 | Murt |
| 4,058,839 A | 11/1977 | Darjany |
| 4,066,873 A | 1/1978 | Schatz |
| 4,119,361 A | 10/1978 | Greenaway |
| 4,202,491 A | 5/1980 | Suzuki |
| 4,206,965 A | 6/1980 | McGrew |
| 4,222,516 A | 9/1980 | Badet et al. |
| 4,277,863 A | 7/1981 | Faneuf |
| 4,303,904 A | 12/1981 | Chasek |
| 4,318,554 A | 3/1982 | Anderson et al. |
| 4,356,646 A | 11/1982 | Johnson, Jr. |
| 4,361,757 A | 11/1982 | Ehrat |
| D270,303 S | 8/1983 | Zautner |
| D270,546 S | 9/1983 | Malmberg |
| 4,421,380 A | 12/1983 | McGrew |
| 4,436,991 A | 3/1984 | Albert et al. |
| 4,443,027 A | 4/1984 | McNelly et al. |
| 4,450,535 A | 5/1984 | dePommery et al. |
| 4,453,074 A | 6/1984 | Weinstein |
| 4,475,308 A | 10/1984 | Heise et al. |
| 4,504,084 A | 3/1985 | Jauch |
| 4,507,652 A | 3/1985 | Vogt et al. |
| D280,214 S | 8/1985 | Opel |
| 4,538,059 A | 8/1985 | Rudland |
| 4,547,002 A | 10/1985 | Colgate, Jr. |
| 4,558,211 A | 12/1985 | Berstein |
| 4,563,024 A | 1/1986 | Blyth |
| 4,581,523 A | 4/1986 | Okuno |
| 4,582,985 A | 4/1986 | Lofberg |
| 4,583,766 A | 4/1986 | Wessel |
| 4,589,686 A | 5/1986 | McGrew |
| 4,593,936 A | 6/1986 | Opel |
| 4,597,814 A | 7/1986 | Colgate, Jr. |
| 4,639,765 A | 1/1987 | dHont |
| 4,641,017 A | 2/1987 | Lopata |
| 4,643,452 A | 2/1987 | Chang |
| 4,656,463 A | 4/1987 | Anders et al. |
| 4,663,518 A | 5/1987 | Borror et al. |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,697,363 A | 10/1987 | Gamm |
| 4,700,055 A | 10/1987 | Kashkashian, Jr. |
| 4,711,690 A | 12/1987 | Haghiri-Tehrani |
| 4,717,221 A | 1/1988 | McGrew |
| 4,725,719 A | 2/1988 | Oncken et al. |
| 4,736,094 A | 4/1988 | Yoshida |
| 4,739,328 A | 4/1988 | Koelle et al. |
| 4,744,497 A | 5/1988 | O'Neal |
| 4,747,147 A | 5/1988 | Sparrow |
| 4,768,811 A | 9/1988 | Oshikoshi et al. |
| 4,779,898 A | 10/1988 | Berning et al. |
| 4,794,142 A | 12/1988 | Alberts et al. |
| 4,795,894 A | 1/1989 | Sugimoto et al. |
| 4,801,790 A | 1/1989 | Solo |
| 4,816,653 A | 3/1989 | Anderl et al. |
| 4,829,690 A | 5/1989 | Andros |
| 4,837,422 A | 6/1989 | Dethloff et al. |
| 4,839,504 A | 6/1989 | Nakano |
| 4,841,570 A * | 6/1989 | Cooper .......................... 380/30 |
| 4,849,617 A | 7/1989 | Ueda |
| 4,852,911 A | 8/1989 | Hoppe |
| 4,853,525 A | 8/1989 | Vogt et al. |
| 4,863,819 A | 9/1989 | Drexler et al. |
| 4,868,849 A | 9/1989 | Tamaoki |
| 4,881,264 A * | 11/1989 | Merkle .......................... 713/177 |
| 4,884,507 A | 12/1989 | Levy |
| 4,889,366 A | 12/1989 | Fabbiani |
| 4,897,533 A | 1/1990 | Lyszczarz |
| 4,897,947 A | 2/1990 | Kass-Pious |
| 4,910,521 A | 3/1990 | Mellon |
| 4,917,292 A | 4/1990 | Drexler |
| 4,918,432 A | 4/1990 | Pauley et al. |
| D307,979 S | 5/1990 | Purvis |
| 4,937,963 A | 7/1990 | Barnes |
| D310,386 S | 9/1990 | Michels et al. |
| 4,961,142 A | 10/1990 | Elliott et al. |
| 4,984,270 A | 1/1991 | LaBounty |
| 4,993,068 A | 2/1991 | Piosenka et al. |
| 4,998,753 A | 3/1991 | Wichael |
| 5,004,899 A | 4/1991 | Ueda |
| 5,010,243 A | 4/1991 | Fukushima et al. |
| 5,015,830 A | 5/1991 | Masuzawa et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,052,328 A | 10/1991 | Eppenbach |
| 5,053,774 A | 10/1991 | Schuermann et al. |
| 5,096,228 A | 3/1992 | Rinderknecht |
| 5,099,226 A | 3/1992 | Andrews |
| 5,101,200 A | 3/1992 | Swett |
| 5,106,125 A | 4/1992 | Antes |
| 5,111,033 A | 5/1992 | Fujita et al. |
| 5,125,356 A | 6/1992 | Galante |
| 5,142,383 A | 8/1992 | Mallik |
| 5,171,039 A | 12/1992 | Dusek |
| 5,175,416 A | 12/1992 | Mansvelt et al. |
| 5,180,902 A | 1/1993 | Schick et al. |
| 5,192,947 A | 3/1993 | Neustein |
| 5,193,114 A | 3/1993 | Moseley |
| 5,197,140 A | 3/1993 | Balmer |
| 5,198,647 A | 3/1993 | Mizuta |
| 5,202,826 A | 4/1993 | McCarthy |
| 5,206,488 A | 4/1993 | Teicher |
| 5,208,110 A | 5/1993 | Smith et al. |
| 5,212,777 A | 5/1993 | Gove et al. |
| 5,217,844 A | 6/1993 | Fukushima et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | IngSimmons et al. |
| 5,245,329 A | 9/1993 | Gokcebay |
| 5,247,304 A | 9/1993 | dHont |
| 5,251,937 A | 10/1993 | Ojster |
| 5,256,473 A | 10/1993 | Kotani et al. |
| 5,257,656 A | 11/1993 | McLeroy |
| 5,259,649 A | 11/1993 | Shomron |
| 5,272,326 A | 12/1993 | Fujita et al. |
| 5,274,392 A | 12/1993 | dHont et al. |
| 5,276,311 A | 1/1994 | Hennige |
| 5,279,019 A | 1/1994 | Knickle |
| 5,285,100 A | 2/1994 | Byatt |
| 5,300,764 A | 4/1994 | Hoshino et al. |
| 5,304,789 A | 4/1994 | Lob et al. |
| 5,305,002 A | 4/1994 | Holodak et al. |
| 5,308,121 A | 5/1994 | Gunn |
| 5,311,679 A | 5/1994 | Birch, Sr. |
| 5,321,751 A | 6/1994 | Ray et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,351,142 A | 9/1994 | Cueli |
| 5,355,411 A | 10/1994 | MacDonald |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | dHont |
| 5,383,687 A | 1/1995 | Suess et al. |
| 5,397,881 A | 3/1995 | Mannik |
| 5,407,893 A | 4/1995 | Koshizuka et al. |
| 5,408,243 A | 4/1995 | dHont |
| 5,410,142 A | 4/1995 | Tsuboi et al. |
| 5,410,649 A | 4/1995 | Gove |
| 5,412,192 A | 5/1995 | Hoss |
| 5,428,363 A | 6/1995 | dHont |
| 5,438,184 A | 8/1995 | Roberts et al. |
| 5,453,747 A | 9/1995 | dHont et al. |

| | | | | | |
|---|---|---|---|---|---|
| 5,461,217 A | 10/1995 | Claus | 5,606,520 A | 2/1997 | Gove et al. |
| 5,461,219 A | 10/1995 | Cronvall | 5,606,594 A | 2/1997 | Register et al. |
| 5,471,592 A | 11/1995 | Gove et al. | 5,607,522 A | 3/1997 | McDonnell |
| 5,477,038 A | 12/1995 | Levine et al. | 5,608,203 A | 3/1997 | Finkelstein et al. |
| 5,477,040 A | 12/1995 | Lalonde | 5,608,406 A | 3/1997 | Eberth et al. |
| 5,478,629 A | 12/1995 | Norman | 5,608,778 A | 3/1997 | Partridge, III |
| 5,479,530 A | 12/1995 | Nair et al. | 5,611,965 A | 3/1997 | Shouji et al. |
| 5,485,510 A | 1/1996 | Colbert | 5,613,001 A | 3/1997 | Bakhoum |
| 5,488,376 A | 1/1996 | Hurta et al. | 5,613,131 A | 3/1997 | Moss et al. |
| 5,489,411 A | 2/1996 | Jha et al. | 5,613,146 A | 3/1997 | Gove et al. |
| 5,489,908 A | 2/1996 | Orthmann et al. | 5,614,703 A | 3/1997 | Martin et al. |
| 5,490,079 A | 2/1996 | Sharpe et al. | 5,619,207 A | 4/1997 | d'Hont |
| 5,491,483 A | 2/1996 | dHont | 5,621,199 A | 4/1997 | Calari et al. |
| 5,491,484 A | 2/1996 | Schuermann | 5,621,396 A | 4/1997 | Flaxl |
| 5,491,715 A | 2/1996 | Flaxl | 5,621,411 A | 4/1997 | Hagl et al. |
| 5,493,312 A | 2/1996 | Knebelkamp | 5,621,412 A | 4/1997 | Sharpe et al. |
| 5,497,121 A | 3/1996 | dHont | 5,625,366 A | 4/1997 | d'Hont |
| 5,500,513 A | 3/1996 | Langhans et al. | 5,625,370 A | 4/1997 | d'Hont |
| 5,500,651 A | 3/1996 | Schuermann | 5,625,695 A | 4/1997 | M'Raihi et al. |
| 5,503,434 A | 4/1996 | Gunn | 5,629,981 A | 5/1997 | Nerlikar |
| 5,506,395 A | 4/1996 | Eppley | 5,638,080 A | 6/1997 | Orthmann et al. |
| 5,513,272 A | 4/1996 | Bogosian, Jr. | 5,640,002 A | 6/1997 | Ruppert et al. |
| 5,513,525 A | 5/1996 | Schurmann | 5,641,050 A | 6/1997 | Smith et al. |
| 5,514,860 A | 5/1996 | Berson | 5,646,607 A | 7/1997 | Schurmann et al. |
| 5,516,153 A | 5/1996 | Kaule | 5,649,118 A | 7/1997 | Carlisle et al. |
| 5,518,810 A | 5/1996 | Nishihara et al. | 5,657,388 A | 8/1997 | Weiss |
| 5,519,381 A | 5/1996 | Marsh et al. | 5,660,319 A | 8/1997 | Falcone et al. |
| 5,520,230 A | 5/1996 | Sumner, III | 5,665,439 A | 9/1997 | Andersen et al. |
| 5,521,966 A | 5/1996 | Friedes et al. | 5,668,876 A | 9/1997 | Falk et al. |
| 5,522,083 A | 5/1996 | Gove et al. | 5,673,106 A | 9/1997 | Thompson |
| 5,525,992 A | 6/1996 | Froschermeier | D384,971 S | 10/1997 | Kawan |
| 5,525,994 A | 6/1996 | Hurta et al. | 5,675,342 A | 10/1997 | Sharpe |
| 5,528,222 A | 6/1996 | Moskowitz et al. | 5,677,953 A | 10/1997 | Dolphin |
| 5,530,232 A | 6/1996 | Taylor | 5,686,920 A | 11/1997 | Hurta et al. |
| 5,533,656 A | 7/1996 | Bonaldi | 5,689,100 A | 11/1997 | Carrithers |
| 5,534,857 A | 7/1996 | Laing et al. | 5,691,731 A | 11/1997 | van Erven |
| 5,537,314 A | 7/1996 | Kanter | 5,692,132 A | 11/1997 | Hogan |
| 5,539,825 A | 7/1996 | Akiyama | 5,694,596 A | 12/1997 | Campbell |
| 5,541,582 A | 7/1996 | Wagner et al. | 5,696,913 A | 12/1997 | Gove et al. |
| 5,541,604 A | 7/1996 | Meier | 5,697,649 A | 12/1997 | Dames et al. |
| 5,543,798 A | 8/1996 | Schuermann | 5,698,837 A | 12/1997 | Furuta |
| 5,544,246 A | 8/1996 | Mandelbaum et al. | 5,699,528 A | 12/1997 | Hogan |
| 5,548,291 A | 8/1996 | Meier | 5,700,037 A | 12/1997 | Keller |
| 5,550,536 A | 8/1996 | Flaxl | 5,701,127 A | 12/1997 | Sharpe |
| 5,550,548 A | 8/1996 | Schuermann | 5,704,046 A | 12/1997 | Hogan |
| 5,552,789 A | 9/1996 | Schuermann | 5,705,101 A | 1/1998 | Oi et al. |
| 5,555,877 A | 9/1996 | Lockwood et al. | 5,705,798 A | 1/1998 | Tarbox |
| 5,557,279 A | 9/1996 | d'Hont | 5,705,852 A | 1/1998 | Orihara et al. |
| 5,557,516 A | 9/1996 | Hogan | 5,710,421 A | 1/1998 | Kokubu |
| 5,559,504 A | 9/1996 | Itsumi et al. | 5,715,314 A | 2/1998 | Payne et al. |
| 5,559,887 A | 9/1996 | Davis et al. | 5,715,399 A | 2/1998 | Bezos |
| 5,561,430 A | 10/1996 | Knebelkamp | 5,720,500 A | 2/1998 | Okazaki et al. |
| 5,563,582 A | 10/1996 | d'Hont | 5,721,781 A | 2/1998 | Deo et al. |
| 5,569,187 A | 10/1996 | Kaiser | 5,724,424 A | 3/1998 | Gifford |
| 5,569,897 A | 10/1996 | Masuda | 5,725,098 A | 3/1998 | Seifert et al. |
| 5,572,226 A | 11/1996 | Tuttle | 5,727,140 A | 3/1998 | Ohtomo et al. |
| 5,572,815 A | 11/1996 | Kovner | 5,727,696 A | 3/1998 | Valiulis |
| 5,575,094 A | 11/1996 | Leake et al. | 5,729,053 A | 3/1998 | Orthmann |
| 5,577,109 A | 11/1996 | Stimson et al. | 5,729,236 A | 3/1998 | Flaxl |
| 5,577,120 A | 11/1996 | Penzias | 5,731,957 A | 3/1998 | Brennan |
| 5,577,121 A | 11/1996 | Davis et al. | 5,732,579 A | 3/1998 | d'Hont et al. |
| 5,577,609 A | 11/1996 | Hexter | 5,734,838 A | 3/1998 | Robinson et al. |
| 5,578,808 A | 11/1996 | Taylor | 5,737,439 A | 4/1998 | Lapsley et al. |
| 5,581,630 A | 12/1996 | Bonneau, Jr. | 5,739,512 A | 4/1998 | Toganazzini |
| 5,585,787 A | 12/1996 | Wallerstein | 5,742,756 A | 4/1998 | Dillaway et al. |
| 5,590,038 A | 12/1996 | Pitroda | 5,742,845 A | 4/1998 | Wagner |
| 5,590,197 A | 12/1996 | Chen et al. | 5,748,137 A | 5/1998 | d'Hont |
| 5,592,150 A | 1/1997 | d'Hont | 5,748,737 A | 5/1998 | Daggar |
| 5,592,767 A | 1/1997 | Treske | 5,758,195 A | 5/1998 | Balmer |
| 5,594,227 A | 1/1997 | Deo | 5,761,306 A | 6/1998 | Lewis |
| 5,594,233 A | 1/1997 | Kenneth et al. | 5,761,493 A | 6/1998 | Blakeley et al. |
| 5,594,448 A | 1/1997 | d'Hont | 5,764,789 A | 6/1998 | Pare, Jr. et al. |
| 5,597,534 A | 1/1997 | Kaiser | 5,768,385 A | 6/1998 | Simon |
| 5,600,175 A | 2/1997 | Orthmann | 5,768,609 A | 6/1998 | Gove et al. |
| 5,602,538 A | 2/1997 | Orthamann et al. | 5,769,457 A | 6/1998 | Warther |
| 5,602,918 A | 2/1997 | Chen et al. | 5,770,843 A | 6/1998 | Rose et al. |
| 5,602,919 A | 2/1997 | Hurta et al. | 5,773,812 A | 6/1998 | Kreft |
| 5,604,342 A | 2/1997 | Fujioka | 5,774,882 A | 6/1998 | Keen et al. |
| 5,604,801 A | 2/1997 | Dolan et al. | 5,777,903 A | 7/1998 | Piosenka |

| | | | | | | |
|---|---|---|---|---|---|---|
| 5,778,067 A | 7/1998 | Jones et al. | 5,890,137 A | 3/1999 | Koreeda | |
| 5,778,069 A | 7/1998 | Thomlinson | D408,054 S | 4/1999 | Leedy, Jr. | |
| 5,778,173 A | 7/1998 | Apte | 5,892,211 A | 4/1999 | Davis et al. | |
| 5,785,680 A | 7/1998 | Niezink et al. | 5,897,622 A | 4/1999 | Blinn et al. | |
| 5,786,587 A | 7/1998 | Colgate, Jr. | 5,898,783 A | 4/1999 | Rohrbach | |
| 5,789,733 A | 8/1998 | Jachimowicz et al. | 5,898,838 A | 4/1999 | Wagner | |
| 5,791,474 A | 8/1998 | Hansen | 5,900,954 A | 5/1999 | Katz et al. | |
| 5,792,337 A | 8/1998 | Padovani et al. | 5,901,239 A | 5/1999 | Kamei | |
| 5,793,324 A | 8/1998 | Aslanidis et al. | 5,903,652 A * | 5/1999 | Mital | 705/78 |
| 5,794,095 A | 8/1998 | Thompson | 5,903,830 A | 5/1999 | Joao et al. | |
| 5,796,831 A | 8/1998 | Paradinas et al. | 5,903,875 A | 5/1999 | Kohara | |
| 5,797,060 A | 8/1998 | Thompson | 5,903,880 A | 5/1999 | Biffar | |
| 5,797,085 A | 8/1998 | Buek et al. | 5,905,798 A | 5/1999 | Nerlikar et al. | |
| 5,797,133 A | 8/1998 | Jones et al. | 5,905,908 A | 5/1999 | Wagner | |
| 5,798,709 A | 8/1998 | Flaxl | 5,907,620 A | 5/1999 | Klemba et al. | |
| 5,799,087 A | 8/1998 | Rosen | 5,909,492 A | 6/1999 | Payne et al. | |
| 5,806,045 A | 9/1998 | Biorge et al. | 5,912,446 A | 6/1999 | Wong et al. | |
| 5,808,758 A | 9/1998 | Solmsdorf | 5,912,678 A | 6/1999 | Saxena et al. | |
| 5,809,142 A | 9/1998 | Hurta et al. | 5,913,203 A | 6/1999 | Wong et al. | |
| 5,809,288 A | 9/1998 | Balmer | 5,914,472 A | 6/1999 | Foladare et al. | |
| 5,809,633 A | 9/1998 | Mundigl et al. | 5,915,016 A | 6/1999 | Savalle et al. | |
| 5,815,252 A | 9/1998 | Price-Francis | 5,915,023 A | 6/1999 | Bernstein | |
| 5,815,657 A | 9/1998 | Williams et al. | 5,915,973 A | 6/1999 | Hoehn-Saric et al. | |
| 5,823,359 A | 10/1998 | Harris et al. | 5,917,168 A | 6/1999 | Nakamura et al. | |
| 5,825,007 A | 10/1998 | Jesadanont | 5,917,913 A | 6/1999 | Wang | |
| 5,825,302 A | 10/1998 | Stafford | 5,917,925 A | 6/1999 | Moore | |
| 5,826,077 A | 10/1998 | Blakeley et al. | 5,918,216 A | 6/1999 | Miksovsky et al. | |
| 5,826,241 A | 10/1998 | Stein et al. | 5,920,058 A | 7/1999 | Weber et al. | |
| 5,826,242 A | 10/1998 | Montulli | 5,920,628 A | 7/1999 | Indeck et al. | |
| 5,826,243 A | 10/1998 | Musmanno et al. | 5,920,629 A | 7/1999 | Rosen | |
| 5,828,044 A | 10/1998 | Jun et al. | 5,920,847 A | 7/1999 | Kolling et al. | |
| 5,834,756 A | 11/1998 | Gutman et al. | 5,923,734 A | 7/1999 | Taskett | |
| 5,835,894 A | 11/1998 | Adcock et al. | 5,923,884 A | 7/1999 | Peyret et al. | |
| 5,838,257 A | 11/1998 | Lambropoulos | 5,924,080 A | 7/1999 | Johnson | |
| 5,838,720 A | 11/1998 | Morelli | 5,924,624 A | 7/1999 | Martin | |
| 5,838,812 A | 11/1998 | Pare, Jr. et al. | 5,928,788 A | 7/1999 | Riedl | |
| 5,841,364 A | 11/1998 | Hagl et al. | 5,929,801 A | 7/1999 | Aslanidis et al. | |
| 5,842,088 A | 11/1998 | Thompson | 5,930,767 A | 7/1999 | Reber et al. | |
| 5,844,218 A | 12/1998 | Kawan et al. | 5,930,777 A | 7/1999 | Barber | |
| 5,844,230 A | 12/1998 | Lalonde | 5,931,917 A | 8/1999 | Nguyen et al. | |
| 5,845,267 A | 12/1998 | Ronen | 5,932,870 A | 8/1999 | Berson | |
| 5,851,149 A | 12/1998 | Xidos et al. | 5,933,328 A | 8/1999 | Wallace et al. | |
| 5,852,812 A | 12/1998 | Reeder | 5,933,624 A | 8/1999 | Balmer | |
| 5,854,891 A | 12/1998 | Postlewaite et al. | 5,936,226 A | 8/1999 | Aucsmith | |
| 5,856,048 A | 1/1999 | Tahara et al. | 5,936,227 A | 8/1999 | Truggelmann et al. | |
| 5,857,079 A | 1/1999 | Claus et al. | 5,938,010 A | 8/1999 | Osterbye | |
| 5,857,152 A | 1/1999 | Everett | 5,942,761 A | 8/1999 | Tuli | |
| 5,857,709 A | 1/1999 | Chock | 5,943,624 A | 8/1999 | Fox et al. | |
| 5,858,006 A | 1/1999 | Van der AA et al. | 5,945,653 A | 8/1999 | Walker et al. | |
| 5,859,419 A | 1/1999 | Wynn | 5,948,116 A | 9/1999 | Aslanidis et al. | |
| 5,859,587 A | 1/1999 | Alicot et al. | 5,949,044 A | 9/1999 | Walker et al. | |
| 5,859,779 A | 1/1999 | Giordano et al. | 5,949,335 A | 9/1999 | Maynard | |
| 5,862,325 A | 1/1999 | Reed et al. | 5,949,876 A | 9/1999 | Ginter et al. | |
| 5,864,306 A | 1/1999 | Dwyer et al. | 5,950,174 A | 9/1999 | Brendzel | |
| 5,864,323 A | 1/1999 | Berthon | 5,950,179 A | 9/1999 | Buchanan | |
| 5,864,830 A | 1/1999 | Armetta et al. | 5,953,512 A | 9/1999 | Cai et al. | |
| 5,865,470 A | 2/1999 | Thompson | 5,953,710 A | 9/1999 | Fleming | |
| 5,867,100 A | 2/1999 | d'Hont | 5,955,717 A | 9/1999 | Vanstone | |
| 5,869,822 A | 2/1999 | Meadows et al. | 5,955,951 A | 9/1999 | Wischerop et al. | |
| 5,870,031 A | 2/1999 | Kaiser et al. | 5,955,969 A | 9/1999 | d'Hont | |
| 5,870,915 A | 2/1999 | d'Hont | 5,956,024 A | 9/1999 | Strickland et al. | |
| 5,875,432 A | 2/1999 | Sehr | 5,956,693 A | 9/1999 | Geerlings | |
| D406,861 S | 3/1999 | Leedy, Jr. | 5,956,699 A | 9/1999 | Wong et al. | |
| 5,878,138 A | 3/1999 | Yacobi | 5,958,004 A | 9/1999 | Helland et al. | |
| 5,878,141 A | 3/1999 | Daly et al. | 5,960,411 A | 9/1999 | Hartman et al. | |
| 5,878,215 A | 3/1999 | Kling et al. | 5,960,416 A | 9/1999 | Block | |
| 5,878,337 A | 3/1999 | Joao et al. | 5,963,915 A | 10/1999 | Kirsch | |
| 5,878,403 A | 3/1999 | DeFrancesco et al. | 5,963,924 A | 10/1999 | Williams et al. | |
| 5,880,675 A | 3/1999 | Trautner | 5,966,697 A | 10/1999 | Fergerson et al. | |
| 5,881,272 A | 3/1999 | Balmer | 5,968,570 A | 10/1999 | Paulucci | |
| 5,883,377 A | 3/1999 | Chapin, Jr. | 5,969,318 A | 10/1999 | Mackenthun | |
| 5,883,810 A | 3/1999 | Franklin et al. | 5,970,148 A | 10/1999 | Meier | |
| 5,884,271 A | 3/1999 | Pitroda | 5,970,470 A | 10/1999 | Walker | |
| 5,884,280 A | 3/1999 | Yoshioka et al. | 5,970,471 A | 10/1999 | Hill | |
| 5,884,292 A | 3/1999 | Baker et al. | 5,970,472 A | 10/1999 | Allsop et al. | |
| 5,884,310 A | 3/1999 | Brichta et al. | 5,970,473 A | 10/1999 | Gerszberg et al. | |
| 5,886,333 A | 3/1999 | Miyake | 5,970,475 A | 10/1999 | Barnes et al. | |
| 5,887,266 A | 3/1999 | Heinonen et al. | 5,971,276 A | 10/1999 | Sano et al. | |
| 5,889,941 A | 3/1999 | Tushie et al. | 5,973,475 A | 10/1999 | Cornbaluzier | |

| Patent No. | Date | Inventor | Ref |
|---|---|---|---|
| 5,974,238 A | 10/1999 | Chase, Jr. | |
| RE36,365 E | 11/1999 | Levine et al. | |
| 5,978,348 A | 11/1999 | Tamura | |
| 5,978,840 A | 11/1999 | Nguyen et al. | |
| 5,979,757 A | 11/1999 | Tracy et al. | |
| 5,979,942 A | 11/1999 | Ivicic | |
| 5,982,293 A | 11/1999 | Everett et al. | |
| 5,983,200 A | 11/1999 | Slotznick | |
| 5,983,207 A | 11/1999 | Turk et al. | |
| 5,983,208 A | 11/1999 | Haller | |
| 5,984,180 A | 11/1999 | Albrecht | |
| 5,987,140 A | 11/1999 | Rowney et al. | |
| 5,987,155 A | 11/1999 | Dunn et al. | |
| 5,987,498 A | 11/1999 | Athing et al. | |
| 5,988,497 A | 11/1999 | Wallace | |
| 5,988,510 A | 11/1999 | Tuttle | |
| 5,989,950 A | 11/1999 | Wu et al. | |
| 5,991,413 A | 11/1999 | Arditti et al. | |
| 5,991,608 A | 11/1999 | Leyten | |
| 5,991,748 A | 11/1999 | Taskett | |
| 5,991,750 A | 11/1999 | Watson | |
| 5,995,014 A | 11/1999 | DiMaria | |
| 5,996,076 A | 11/1999 | Rowney et al. | |
| 5,999,625 A * | 12/1999 | Bellare et al. | 705/64 |
| 5,999,914 A | 12/1999 | Blinn et al. | |
| 6,000,832 A | 12/1999 | Franklin et al. | |
| 6,002,438 A | 12/1999 | Hocevar et al. | |
| 6,002,767 A | 12/1999 | Kramer | |
| 6,003,014 A | 12/1999 | Lee et al. | |
| 6,005,942 A | 12/1999 | Chan et al. | |
| 6,006,216 A | 12/1999 | Griffin et al. | |
| 6,006,988 A | 12/1999 | Behrmann et al. | |
| 6,009,412 A | 12/1999 | Storey | |
| 6,011,487 A | 1/2000 | Plocher | |
| 6,012,039 A | 1/2000 | Hoffman et al. | |
| 6,012,049 A | 1/2000 | Kawan | |
| 6,012,143 A | 1/2000 | Tanaka | |
| 6,012,636 A | 1/2000 | Smith | |
| 6,014,634 A | 1/2000 | Scroggie et al. | |
| 6,014,635 A | 1/2000 | Harris et al. | |
| 6,014,636 A | 1/2000 | Reeder | |
| 6,014,645 A | 1/2000 | Cunningham | |
| 6,014,646 A | 1/2000 | Vallee et al. | |
| 6,014,648 A | 1/2000 | Brennan | |
| 6,014,650 A | 1/2000 | Zampese | |
| 6,014,748 A | 1/2000 | Tushi et al. | |
| 6,016,476 A | 1/2000 | Maes et al. | |
| 6,016,482 A | 1/2000 | Molinari et al. | |
| 6,016,484 A | 1/2000 | Williams et al. | |
| 6,018,717 A | 1/2000 | Lee et al. | |
| 6,018,718 A | 1/2000 | Walker et al. | |
| RE36,580 E | 2/2000 | Bogosian, Jr. | |
| 6,021,943 A | 2/2000 | Chastain | |
| 6,023,510 A | 2/2000 | Epstein | |
| 6,024,286 A | 2/2000 | Bradley et al. | |
| 6,024,385 A | 2/2000 | Goda | |
| 6,025,283 A | 2/2000 | Roberts | |
| 6,026,166 A | 2/2000 | LeBourgeois | |
| 6,027,028 A | 2/2000 | Pieterse et al. | |
| 6,029,147 A | 2/2000 | Horadan et al. | |
| 6,029,149 A | 2/2000 | Dykstra et al. | |
| 6,029,150 A | 2/2000 | Kravitz | |
| 6,029,175 A | 2/2000 | Chow | |
| 6,029,890 A | 2/2000 | Austin | |
| 6,029,892 A | 2/2000 | Miyake | |
| 6,032,136 A | 2/2000 | Brake, Jr. et al. | |
| 6,032,866 A | 3/2000 | Knighton et al. | |
| 6,036,100 A | 3/2000 | Asami | |
| 6,038,292 A | 3/2000 | Thomas | |
| 6,038,551 A | 3/2000 | Barlow et al. | |
| 6,038,584 A | 3/2000 | Balmer | |
| 6,041,308 A | 3/2000 | Walker et al. | |
| 6,041,410 A | 3/2000 | Hsu et al. | |
| 6,041,412 A | 3/2000 | Timson et al. | |
| 6,044,360 A | 3/2000 | Picciallo | |
| 6,044,388 A * | 3/2000 | DeBellis et al. | 708/254 |
| 6,047,888 A | 4/2000 | Dethloff | |
| 6,050,494 A | 4/2000 | Song et al. | |
| 6,050,605 A | 4/2000 | Mikelionis et al. | |
| 6,052,675 A | 4/2000 | Checchio | |
| 6,058,418 A | 5/2000 | Kobata | |
| 6,060,815 A | 5/2000 | Nysen | |
| 6,061,344 A | 5/2000 | Wood, Jr. | |
| 6,061,703 A * | 5/2000 | DeBellis et al. | 708/254 |
| 6,061,789 A | 5/2000 | Hauser et al. | |
| 6,064,320 A | 5/2000 | d'Hont et al. | |
| 6,064,751 A | 5/2000 | Smithies et al. | |
| 6,064,981 A | 5/2000 | Barni et al. | |
| 6,065,675 A | 5/2000 | Teicher | |
| 6,067,621 A * | 5/2000 | Yu et al. | 713/172 |
| 6,068,184 A | 5/2000 | Barnett | |
| 6,068,193 A | 5/2000 | Kreft | |
| 6,069,952 A | 5/2000 | Saito et al. | |
| 6,070,003 A | 5/2000 | Gove et al. | |
| 6,070,150 A | 5/2000 | Remington et al. | |
| 6,070,154 A | 5/2000 | Tavor et al. | |
| 6,072,870 A | 6/2000 | Nguyen et al. | |
| 6,073,112 A | 6/2000 | Geerlings | |
| 6,073,840 A | 6/2000 | Marion | |
| 6,076,078 A | 6/2000 | Camp et al. | |
| 6,076,296 A | 6/2000 | Schaeffer | |
| 6,078,888 A * | 6/2000 | Johnson, Jr. | 705/1 |
| 6,078,906 A | 6/2000 | Huberman | |
| 6,078,908 A | 6/2000 | Schmitz | |
| 6,081,790 A | 6/2000 | Rosen | |
| RE36,788 E | 7/2000 | Mansvelt et al. | |
| 6,082,422 A | 7/2000 | Kaminski | |
| 6,084,967 A | 7/2000 | Kennedy et al. | |
| 6,085,976 A | 7/2000 | Sehr | |
| 6,086,971 A | 7/2000 | Haas et al. | |
| 6,088,683 A | 7/2000 | Jalili | |
| 6,088,686 A | 7/2000 | Walker et al. | |
| 6,088,717 A | 7/2000 | Reed et al. | |
| 6,088,755 A | 7/2000 | Kobayashi et al. | |
| 6,088,797 A | 7/2000 | Rosen | |
| 6,089,611 A | 7/2000 | Blank | |
| 6,091,835 A | 7/2000 | Smithies et al. | |
| 6,092,057 A | 7/2000 | Zimmerman et al. | |
| 6,092,198 A | 7/2000 | Lanzy et al. | |
| 6,095,413 A | 8/2000 | Tetro et al. | |
| 6,095,567 A | 8/2000 | Buell | |
| 6,098,053 A | 8/2000 | Slater | |
| 6,098,879 A | 8/2000 | Terranova | |
| 6,099,043 A | 8/2000 | Story | |
| 6,100,804 A | 8/2000 | Brady et al. | |
| 6,101,174 A | 8/2000 | Langston | |
| 6,101,477 A | 8/2000 | Hohle et al. | |
| 6,102,162 A | 8/2000 | Teicher | |
| 6,102,672 A | 8/2000 | Woollenweber | |
| 6,104,311 A | 8/2000 | Lastinger | |
| 6,104,922 A | 8/2000 | Baumann | |
| 6,105,008 A | 8/2000 | Davis et al. | |
| 6,105,013 A | 8/2000 | Curry et al. | |
| 6,105,865 A | 8/2000 | Hardesty | |
| 6,107,920 A | 8/2000 | Eberhart et al. | |
| 6,108,641 A | 8/2000 | Kenna et al. | |
| 6,109,525 A | 8/2000 | Blomqvist et al. | |
| 6,112,152 A | 8/2000 | Tuttle | |
| 6,112,191 A | 8/2000 | Burke | |
| 6,115,040 A | 9/2000 | Bladow et al. | |
| 6,115,360 A | 9/2000 | Quay et al. | |
| 6,115,458 A | 9/2000 | Taskett | |
| 6,116,423 A | 9/2000 | Troxtell, Jr. et al. | |
| 6,116,505 A | 9/2000 | Withrow | |
| 6,116,655 A | 9/2000 | Thouin et al. | |
| 6,116,736 A | 9/2000 | Stark et al. | |
| 6,118,189 A | 9/2000 | Flaxl | |
| 6,120,461 A | 9/2000 | Smyth | |
| 6,121,544 A | 9/2000 | Petsinger | |
| 6,122,375 A * | 9/2000 | Takaragi et al. | 380/28 |
| 6,122,625 A | 9/2000 | Rosen | |
| 6,123,223 A | 9/2000 | Watkins | |
| 6,125,352 A | 9/2000 | Franklin et al. | |
| D432,939 S | 10/2000 | Hooglander | |
| 6,128,604 A | 10/2000 | Sakamaki et al. | |
| 6,129,274 A | 10/2000 | Suzuki | |
| 6,130,623 A | 10/2000 | MacLellan et al. | |
| 6,133,834 A | 10/2000 | Eberth et al. | |

| | | | | | | |
|---|---|---|---|---|---|---|
| 6,138,913 | A | 10/2000 | Cyr et al. | 6,260,088 | B1 | 7/2001 | Gove et al. |
| 6,138,917 | A | 10/2000 | Chapin, Jr. | 6,263,316 | B1 | 7/2001 | Khan et al. |
| 6,141,421 | A * | 10/2000 | Takaragi et al. ............... 380/30 | 6,263,446 | B1 | 7/2001 | Kausik et al. |
| 6,141,651 | A | 10/2000 | Riley et al. | 6,264,106 | B1 | 7/2001 | Bridgelall |
| 6,141,752 | A | 10/2000 | Dancs et al. | 6,265,977 | B1 | 7/2001 | Vega et al. |
| 6,144,916 | A | 11/2000 | Wood et al. | 6,266,754 | B1 | 7/2001 | Laczko, Sr. et al. |
| 6,144,948 | A | 11/2000 | Walker et al. | 6,267,292 | B1 | 7/2001 | Walker et al. |
| 6,148,093 | A | 11/2000 | McConnell et al. | 6,268,788 | B1 | 7/2001 | Gray |
| 6,148,484 | A | 11/2000 | Andreae, Jr. | 6,269,348 | B1 | 7/2001 | Pare, Jr. et al. |
| 6,154,879 | A | 11/2000 | Pare et al. | 6,273,335 | B1 | 8/2001 | Sloan |
| 6,155,168 | A | 12/2000 | Sakamoto | 6,277,232 | B1 | 8/2001 | Wang et al. |
| 6,157,824 | A | 12/2000 | Bailey | 6,282,522 | B1 | 8/2001 | Davis et al. |
| 6,163,771 | A | 12/2000 | Walker et al. | D447,515 | S | 9/2001 | Faenza, Jr. et al. |
| 6,167,236 | A | 12/2000 | Kaiser et al. | 6,286,763 | B1 | 9/2001 | Reynolds et al. |
| 6,168,083 | B1 | 1/2001 | Berger et al. | 6,289,324 | B1 | 9/2001 | Kawan |
| 6,171,138 | B1 | 1/2001 | Lefebvre et al. | 6,290,137 | B1 | 9/2001 | Kiekhaefer |
| 6,173,269 | B1 | 1/2001 | Solokl et al. | 6,293,462 | B1 | 9/2001 | Gangi |
| 6,173,272 | B1 | 1/2001 | Thomas et al. | 6,296,188 | B1 | 10/2001 | Kiekhaefer |
| 6,173,897 | B1 | 1/2001 | Halpern | 6,297,727 | B1 | 10/2001 | Nelson, Jr. |
| 6,173,898 | B1 | 1/2001 | Mande | 6,304,223 | B1 | 10/2001 | Hilton et al. |
| 6,173,899 | B1 | 1/2001 | Rozin | 6,307,938 | B1 * | 10/2001 | Matyas et al. ............... 380/44 |
| 6,177,859 | B1 | 1/2001 | Tuttle et al. | 6,307,956 | B1 | 10/2001 | Black |
| 6,177,860 | B1 | 1/2001 | Cromer et al. | 6,309,098 | B1 | 10/2001 | Wong |
| 6,179,205 | B1 | 1/2001 | Sloan | 6,315,193 | B1 | 11/2001 | Hogan |
| 6,179,206 | B1 | 1/2001 | Matsumori | 6,315,195 | B1 | 11/2001 | Ramacchandran |
| 6,181,287 | B1 | 1/2001 | Beigel | 6,315,206 | B1 | 11/2001 | Hansen et al. |
| 6,182,895 | B1 | 2/2001 | Albrecht | 6,317,721 | B1 | 11/2001 | Hurta et al. |
| 6,184,788 | B1 | 2/2001 | Middlemiss et al. | 6,317,750 | B1 | 11/2001 | Tortolani et al. |
| 6,185,307 | B1 | 2/2001 | Johnson, Jr. | 6,317,755 | B1 | 11/2001 | Rakers et al. |
| 6,188,994 | B1 | 2/2001 | Egendorf | 6,318,636 | B1 | 11/2001 | Reynolds et al. |
| 6,189,779 | B1 | 2/2001 | Verdicchio et al. | 6,323,566 | B1 | 11/2001 | Meier |
| 6,189,787 | B1 | 2/2001 | Dorf | 6,325,285 | B1 | 12/2001 | Baratelli |
| 6,192,255 | B1 | 2/2001 | Lewis et al. | 6,325,293 | B1 | 12/2001 | Moreno |
| 6,195,006 | B1 | 2/2001 | Bowers et al. | 6,326,934 | B1 | 12/2001 | Kinzie |
| 6,196,465 | B1 | 3/2001 | Awano | 6,327,573 | B1 | 12/2001 | Walker et al. |
| 6,197,396 | B1 | 3/2001 | Haas et al. | 6,327,578 | B1 | 12/2001 | Linehan |
| 6,198,728 | B1 | 3/2001 | Hulyalkar et al. | 6,329,920 | B1 | 12/2001 | Morrison et al. |
| 6,198,762 | B1 | 3/2001 | Krasnov | 6,330,544 | B1 | 12/2001 | Walker et al. |
| 6,198,875 | B1 | 3/2001 | Edenson et al. | 6,331,972 | B1 | 12/2001 | Harris et al. |
| 6,199,079 | B1 | 3/2001 | Gupta et al. | 6,332,134 | B1 | 12/2001 | Foster |
| 6,199,762 | B1 | 3/2001 | Hohle | 6,332,193 | B1 | 12/2001 | Glass et al. |
| 6,200,272 | B1 | 3/2001 | Linden | D453,160 | S | 1/2002 | Pentz et al. |
| 6,202,927 | B1 | 3/2001 | Bashan et al. | D453,161 | S | 1/2002 | Pentz |
| 6,205,151 | B1 | 3/2001 | Quay et al. | 6,336,095 | B1 | 1/2002 | Rosen |
| 6,206,293 | B1 | 3/2001 | Gutman et al. | 6,338,048 | B1 | 1/2002 | Mori |
| 6,213,390 | B1 | 4/2001 | Oneda | 6,339,384 | B1 | 1/2002 | Valdes-Rodriguez |
| 6,213,391 | B1 | 4/2001 | Lewis | 6,342,844 | B1 | 1/2002 | Rozin |
| 6,215,437 | B1 | 4/2001 | Schurmann et al. | D453,337 | S | 2/2002 | Pentz et al. |
| 6,216,219 | B1 | 4/2001 | Cai et al. | D453,338 | S | 2/2002 | Pentz et al. |
| 6,219,439 | B1 | 4/2001 | Burger | D453,516 | S | 2/2002 | Pentz |
| 6,219,639 | B1 | 4/2001 | Bakis et al. | D454,910 | S | 3/2002 | Smith et al. |
| 6,220,510 | B1 | 4/2001 | Everett et al. | 6,353,420 | B1 | 3/2002 | Chung |
| 6,222,914 | B1 | 4/2001 | McMullin | 6,353,811 | B1 | 3/2002 | Weissman |
| D442,627 | S | 5/2001 | Webb et al. | 6,360,953 | B1 | 3/2002 | Lin et al. |
| D442,629 | S | 5/2001 | Webb et al. | 6,363,363 | B1 | 3/2002 | Haller et al. |
| 6,223,977 | B1 | 5/2001 | Hill | 6,364,208 | B1 | 4/2002 | Stanford et al. |
| 6,223,984 | B1 | 5/2001 | Renner et al. | 6,367,011 | B1 | 4/2002 | Lee et al. |
| 6,224,109 | B1 | 5/2001 | Yang | 6,374,245 | B1 | 4/2002 | Park |
| 6,226,382 | B1 | 5/2001 | M'Raihi et al. | 6,377,034 | B1 | 4/2002 | Ivanov |
| 6,227,424 | B1 | 5/2001 | Roegner | 6,378,073 | B1 | 4/2002 | Davis et al. |
| 6,227,447 | B1 | 5/2001 | Campisano | D457,556 | S | 5/2002 | Hochschild |
| 6,230,270 | B1 | 5/2001 | Laczko, Sr. | 6,386,444 | B1 | 5/2002 | Sullivan |
| 6,232,917 | B1 | 5/2001 | Baumer et al. | 6,388,533 | B2 | 5/2002 | Swoboda |
| 6,233,348 | B1 | 5/2001 | Fujii et al. | 6,390,375 | B2 | 5/2002 | Kayanakis |
| 6,233,683 | B1 | 5/2001 | Chan et al. | 6,397,198 | B1 | 5/2002 | Hoffman et al. |
| 6,237,848 | B1 | 5/2001 | Everett | 6,400,272 | B1 | 6/2002 | Holtzman et al. |
| 6,239,675 | B1 | 5/2001 | Flaxl | 6,402,026 | B1 | 6/2002 | Schwier |
| 6,240,187 | B1 | 5/2001 | Lewis | 6,402,028 | B1 | 6/2002 | Graham, Jr. et al. |
| 6,240,989 | B1 | 6/2001 | Masoud | 6,404,341 | B1 | 6/2002 | Reid |
| 6,247,030 | B1 | 6/2001 | Suzuki | 6,406,935 | B2 | 6/2002 | Kayanakis et al. |
| 6,248,199 | B1 | 6/2001 | Smulson | 6,411,611 | B1 | 6/2002 | Van der Tuijn |
| 6,248,314 | B1 | 6/2001 | Nakashimada et al. | D460,455 | S | 7/2002 | Pentz |
| 6,250,554 | B1 | 6/2001 | Leo et al. | 6,415,978 | B1 | 7/2002 | McAllister |
| 6,250,557 | B1 | 6/2001 | Forslund et al. | 6,419,158 | B2 | 7/2002 | Hooglander |
| 6,255,031 | B1 | 7/2001 | Yao et al. | 6,421,650 | B1 | 7/2002 | Goetz et al. |
| 6,256,391 | B1 * | 7/2001 | Ishiguro et al. ............... 380/203 | 6,422,464 | B1 | 7/2002 | Terranova |
| 6,257,486 | B1 | 7/2001 | Teicher et al. | 6,422,472 | B1 | 7/2002 | Thevenot et al. |
| 6,259,769 | B1 | 7/2001 | Page | 6,424,029 | B1 | 7/2002 | Giesler |
| 6,260,026 | B1 | 7/2001 | Tomida et al. | 6,424,249 | B1 | 7/2002 | Houvener |

| | | |
|---|---|---|
| RE37,822 E | 8/2002 | Anthonyson |
| D461,477 S | 8/2002 | Pentz |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| D462,965 S | 9/2002 | Pentz |
| D462,966 S | 9/2002 | Pentz et al. |
| 6,445,794 B1 | 9/2002 | Shefi |
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,480,869 B1 | 11/2002 | Fujioka |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,491,639 B1 | 12/2002 | Turcott |
| 6,494,367 B1 | 12/2002 | Zacharias |
| 6,494,380 B2 | 12/2002 | Jarosz |
| 6,496,594 B1 | 12/2002 | Prokoski |
| 6,501,832 B1 | 12/2002 | Saylor et al. |
| 6,505,772 B1 | 1/2003 | Mollett et al. |
| 6,507,662 B1 | 1/2003 | Brooks |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,588,673 B1 | 7/2003 | Chan et al. |
| 6,589,119 B1 | 7/2003 | Orus et al. |
| 6,591,249 B2 | 7/2003 | Zoka |
| 6,598,024 B1 | 7/2003 | Walker et al. |
| 6,601,622 B1 | 8/2003 | Young |
| 6,601,759 B2 | 8/2003 | Fife et al. |
| 6,601,762 B2 | 8/2003 | Piotrowski |
| 6,608,551 B1 | 8/2003 | Anderson et al. |
| 6,608,995 B1 | 8/2003 | Kawasaki et al. |
| 6,609,655 B1 | 8/2003 | Harrell |
| 6,609,656 B1 | 8/2003 | Elledge |
| 6,609,658 B1 | 8/2003 | Sehr |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,631,849 B2 | 10/2003 | Blossom |
| 6,636,620 B1 | 10/2003 | Hoshino |
| 6,636,833 B1 | 10/2003 | Flitcroft et al. |
| 6,644,551 B2 | 11/2003 | Clayman et al. |
| 6,650,887 B2 | 11/2003 | McGregor et al. |
| 6,651,168 B1 | 11/2003 | Kao et al. |
| 6,651,813 B2 | 11/2003 | Vallans et al. |
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,681,926 B2 | 1/2004 | De Volpi |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,705,530 B2 | 3/2004 | Kiekhaefer |
| 6,708,375 B1 | 3/2004 | Johnson |
| 6,711,262 B1 | 3/2004 | Watanen |
| 6,732,919 B2 | 5/2004 | Macklin et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,751,805 B1 | 6/2004 | Austion |
| 6,760,581 B2 | 7/2004 | Dutta |
| 6,763,500 B2 | 7/2004 | Black et al. |
| 6,764,014 B2 | 7/2004 | Lasch et al. |
| 6,765,470 B2 | 7/2004 | Shinzaki |
| 6,766,952 B2 | 7/2004 | Luu |
| 6,769,718 B1 | 8/2004 | Warther et al. |
| 6,771,981 B1 | 8/2004 | Zalewski et al. |
| 6,789,012 B1 | 9/2004 | Childs et al. |
| 6,789,733 B2 | 9/2004 | Terranova et al. |
| 6,793,141 B1 | 9/2004 | Graham |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,830,193 B2 | 12/2004 | Tanaka |
| 6,834,270 B1 | 12/2004 | Pagani et al. |
| 6,834,795 B1 | 12/2004 | Rasmussen et al. |
| 6,843,415 B2 | 1/2005 | Vogler |
| 6,845,863 B1 | 1/2005 | Riley |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,895,310 B1 | 5/2005 | Kolls |
| 6,898,299 B1 | 5/2005 | Brooks |
| H2120 H | 7/2005 | Cudlitz |
| 6,914,517 B2 | 7/2005 | Kinsella |
| 6,915,277 B1 | 7/2005 | Manchester et al. |
| 6,920,560 B2 | 7/2005 | Wallace |
| 6,924,729 B1 | 8/2005 | Aschauer et al. |
| 6,925,439 B1 | 8/2005 | Pitroda |
| 6,925,565 B2 | 8/2005 | Black |
| 6,928,181 B2 | 8/2005 | Brooks |
| 6,931,538 B1 | 8/2005 | Sawaguchi |
| 6,934,861 B2 | 8/2005 | Haala |
| D509,243 S | 9/2005 | Hunter, Jr. et al. |
| 6,940,461 B2 | 9/2005 | Nantz et al. |
| 6,944,402 B1 | 9/2005 | Baker et al. |
| 6,944,768 B2 | 9/2005 | Siegel et al. |
| 6,948,130 B2 * | 9/2005 | Long et al. .................. 715/752 |
| 6,959,874 B2 | 11/2005 | Bardwell |

| | | |
|---|---|---|
| 6,961,448 B2 | 11/2005 | Nichols et al. |
| 6,970,583 B2 | 11/2005 | Black |
| 6,978,933 B2 | 12/2005 | Yap et al. |
| 6,986,099 B2 | 1/2006 | Todd |
| 6,990,480 B1 | 1/2006 | Burt |
| 6,994,262 B1 | 2/2006 | Warther |
| 7,003,497 B2 | 2/2006 | Maes |
| 7,003,501 B2 | 2/2006 | Ostroff |
| 7,004,385 B1 | 2/2006 | Douglass |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,069,444 B2 | 6/2006 | Lowensohn et al. |
| 7,070,112 B2 | 7/2006 | Beenau et al. |
| 7,085,532 B2 * | 8/2006 | Palin et al. .................. 455/41.2 |
| 7,093,767 B2 | 8/2006 | Faenza et al. |
| 7,096,204 B1 | 8/2006 | Chen et al. |
| 7,096,494 B1 | 8/2006 | Chen |
| 7,100,821 B2 | 9/2006 | Rasti |
| 7,102,523 B2 | 9/2006 | Shanks et al. |
| 7,103,575 B1 | 9/2006 | Linehan |
| 7,108,190 B2 | 9/2006 | Burgan et al. |
| 7,119,659 B2 | 10/2006 | Bonalle et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misara et al. |
| 7,172,112 B2 | 2/2007 | Bonalle et al. |
| 7,213,748 B2 | 5/2007 | Tsuei et al. |
| 7,237,121 B2 * | 6/2007 | Cammack et al. ............ 713/189 |
| 7,239,226 B2 | 7/2007 | Berardi et al. |
| 7,254,557 B1 | 8/2007 | Gillin et al. |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |
| 2001/0017584 A1 | 8/2001 | Shinzaki |
| 2001/0018660 A1 | 8/2001 | Sehr |
| 2001/0022446 A1 | 9/2001 | Klure |
| 2001/0024157 A1 | 9/2001 | Hansmann et al. |
| 2001/0029493 A1 | 10/2001 | Pare et al. |
| 2001/0030238 A1 | 10/2001 | Arisawa |
| 2001/0032192 A1 | 10/2001 | Putta et al. |
| 2001/0034565 A1 | 10/2001 | Leatherman |
| 2001/0034720 A1 | 10/2001 | Armes |
| 2001/0036301 A1 | 11/2001 | Yamaguchi et al. |
| 2001/0036835 A1 | 11/2001 | Leedom, Jr. |
| 2001/0039617 A1 | 11/2001 | Buhrlen et al. |
| 2001/0040507 A1 | 11/2001 | Eckstein et al. |
| 2001/0045469 A1 | 11/2001 | Hooglander |
| 2001/0049628 A1 | 12/2001 | Icho |
| 2001/0053239 A1 | 12/2001 | Takhar |
| 2001/0055411 A1 | 12/2001 | Black |
| 2002/0002468 A1 | 1/2002 | Spagna et al. |
| 2002/0011519 A1 | 1/2002 | Shults |
| 2002/0014529 A1 | 2/2002 | Tanaka |
| 2002/0014952 A1 | 2/2002 | Terranova |
| 2002/0016687 A1 | 2/2002 | Felsenstein et al. |
| 2002/0019807 A1 | 2/2002 | Halpern |
| 2002/0024590 A1 | 2/2002 | Pena |
| 2002/0026419 A1 | 2/2002 | Maritzen et al. |
| 2002/0026575 A1 | 2/2002 | Wheeler et al. |
| 2002/0028704 A1 | 3/2002 | Bloomfield et al. |
| 2002/0030579 A1 | 3/2002 | Albert et al. |
| 2002/0030581 A1 | 3/2002 | Janiak et al. |
| 2002/0035548 A1 | 3/2002 | Hogan et al. |
| 2002/0036237 A1 | 3/2002 | Atherton et al. |
| 2002/0038818 A1 | 4/2002 | Zingher et al. |
| 2002/0040935 A1 | 4/2002 | Weyant |
| 2002/0040936 A1 | 4/2002 | Wentker et al. |
| 2002/0041093 A1 | 4/2002 | Cox et al. |
| 2002/0042782 A1 | 4/2002 | Albazz et al. |
| 2002/0043566 A1 | 4/2002 | Goodman et al. |
| 2002/0044657 A1 * | 4/2002 | Asano et al. ................... 380/201 |
| 2002/0046341 A1 | 4/2002 | Kazaks et al. |
| 2002/0052839 A1 | 5/2002 | Takatori |
| 2002/0062249 A1 | 5/2002 | Iannacci |
| 2002/0062284 A1 | 5/2002 | Kawan |
| 2002/0062291 A1 | 5/2002 | Zoka |
| 2002/0066784 A1 | 6/2002 | Segal et al. |
| 2002/0072349 A1 | 6/2002 | Geiselman et al. |
| 2002/0073025 A1 | 6/2002 | Tanner et al. |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0083320 A1 | 6/2002 | Vatanen |
| 2002/0087869 A1 | 7/2002 | Kim |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0095588 A1 | 7/2002 | Shigematsu et al. |
| 2002/0097142 A1 | 7/2002 | Janiak et al. |
| 2002/0097144 A1 | 7/2002 | Collins et al. |
| 2002/0099665 A1 | 7/2002 | Burger et al. |
| 2002/0107007 A1 | 8/2002 | Gerson |
| 2002/0107742 A1 | 8/2002 | Magill |
| 2002/0107791 A1 | 8/2002 | Nobrega et al. |
| 2002/0107798 A1 * | 8/2002 | Hameau et al. .................. 705/41 |
| 2002/0108062 A1 | 8/2002 | Nakajima et al. |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0111919 A1 | 8/2002 | Weller et al. |
| 2002/0112177 A1 | 8/2002 | Voltmer et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0122543 A1 * | 9/2002 | Rowen ........................ 379/93.01 |
| 2002/0125164 A1 | 9/2002 | Bassinson |
| 2002/0126010 A1 | 9/2002 | Trimble et al. |
| 2002/0128977 A1 | 9/2002 | Nambiar et al. |
| 2002/0129248 A1 | 9/2002 | Wheeler et al. |
| 2002/0130186 A1 | 9/2002 | Lasch et al. |
| 2002/0130187 A1 | 9/2002 | Berg et al. |
| 2002/0131567 A1 | 9/2002 | Maginas |
| 2002/0133467 A1 | 9/2002 | Hobson et al. |
| 2002/0133725 A1 | 9/2002 | Roy et al. |
| 2002/0138351 A1 | 9/2002 | Houvener et al. |
| 2002/0138425 A1 | 9/2002 | Shimizu et al. |
| 2002/0138438 A1 | 9/2002 | Bardwell |
| 2002/0139839 A1 | 10/2002 | Catan |
| 2002/0140542 A1 | 10/2002 | Prokoski et al. |
| 2002/0145043 A1 | 10/2002 | Challa et al. |
| 2002/0147002 A1 | 10/2002 | Trop et al. |
| 2002/0147600 A1 | 10/2002 | Waters et al. |
| 2002/0147913 A1 | 10/2002 | Lun Yip |
| 2002/0148892 A1 | 10/2002 | Bardwell |
| 2002/0149467 A1 | 10/2002 | Calvesio et al. |
| 2002/0152123 A1 | 10/2002 | Giordano et al. |
| 2002/0153410 A1 | 10/2002 | Santini |
| 2002/0153424 A1 | 10/2002 | Li |
| 2002/0154795 A1 | 10/2002 | Lee et al. |
| 2002/0158747 A1 | 10/2002 | McGregor et al. |
| 2002/0163421 A1 | 11/2002 | Wang et al. |
| 2002/0165931 A1 | 11/2002 | Greer et al. |
| 2002/0166891 A1 | 11/2002 | Stoutenburg et al. |
| 2002/0166897 A1 | 11/2002 | Hooglander |
| 2002/0169673 A1 | 11/2002 | Prorock et al. |
| 2002/0174067 A1 | 11/2002 | Hoffman et al. |

| | | | | | | |
|---|---|---|---|---|---|---|
| 2002/0175805 A9 | 11/2002 | Armstrong et al. | | 2003/0177102 A1 | 9/2003 | Robinson |
| 2002/0176522 A1 | 11/2002 | Fan | | 2003/0177347 A1 | 9/2003 | Schneier et al. |
| 2002/0178063 A1 | 11/2002 | Gravelle et al. | | 2003/0178495 A1 | 9/2003 | Jones et al. |
| 2002/0178124 A1 | 11/2002 | Lewis | | 2003/0183689 A1 | 10/2003 | Swift et al. |
| 2002/0178369 A1 | 11/2002 | Black | | 2003/0183695 A1 | 10/2003 | Labrec et al. |
| 2002/0179704 A1 | 12/2002 | Deaton | | 2003/0183699 A1 | 10/2003 | Masui |
| 2002/0185543 A1 | 12/2002 | Pentz et al. | | 2003/0187786 A1 | 10/2003 | Swift et al. |
| 2002/0186133 A1 | 12/2002 | Loof | | 2003/0187787 A1 | 10/2003 | Freund |
| 2002/0186838 A1 | 12/2002 | Brandys | | 2003/0187790 A1 | 10/2003 | Swift et al. |
| 2002/0188501 A1 | 12/2002 | Lefkowith | | 2003/0187796 A1 | 10/2003 | Swift et al. |
| 2002/0188854 A1 | 12/2002 | Heaven et al. | | 2003/0191949 A1 | 10/2003 | Odagawa |
| 2002/0188855 A1 | 12/2002 | Nakayama et al. | | 2003/0195037 A1 | 10/2003 | Vuong et al. |
| 2002/0190124 A1 | 12/2002 | Piotrowski | | 2003/0195842 A1 | 10/2003 | Reece |
| 2002/0190125 A1 | 12/2002 | Stockhammer | | 2003/0195843 A1 | 10/2003 | Matsuda et al. |
| 2002/0191816 A1 | 12/2002 | Maritzen et al. | | 2003/0197593 A1 | 10/2003 | Siegel et al. |
| 2002/0192856 A1 | 12/2002 | Halope et al. | | 2003/0200184 A1 | 10/2003 | Dominguez et al. |
| 2002/0193102 A1 | 12/2002 | Hyyppa et al. | | 2003/0208439 A1 | 11/2003 | Rast |
| 2002/0194137 A1 | 12/2002 | Park et al. | | 2003/0218066 A1 | 11/2003 | Fernandes et al. |
| 2002/0194303 A1 | 12/2002 | Suila et al. | | 2003/0220876 A1 | 11/2003 | Burger et al. |
| 2002/0194503 A1 | 12/2002 | Faith et al. | | 2003/0222153 A1 | 12/2003 | Pentz et al. |
| 2002/0196963 A1 | 12/2002 | Bardwell | | 2003/0222909 A1* | 12/2003 | Long et al. .................... 345/752 |
| 2003/0001006 A1 | 1/2003 | Lee | | 2003/0223625 A1 | 12/2003 | Hillhouse et al. |
| 2003/0001755 A1 | 1/2003 | Tiernay et al. | | 2003/0225623 A1 | 12/2003 | Wankmueller |
| 2003/0004866 A1 | 1/2003 | Huennekens et al. | | 2003/0225713 A1 | 12/2003 | Atkinson et al. |
| 2003/0004881 A1 | 1/2003 | Shinzaki et al. | | 2003/0226041 A1 | 12/2003 | Palmer et al. |
| 2003/0005310 A1 | 1/2003 | Shinzaki | | 2003/0227550 A1 | 12/2003 | Manico et al. |
| 2003/0006901 A1 | 1/2003 | Kim et al. | | 2003/0229793 A1 | 12/2003 | McCall et al. |
| 2003/0009382 A1 | 1/2003 | DArbelott et al. | | 2003/0230514 A1 | 12/2003 | Baker |
| 2003/0014307 A1 | 1/2003 | Heng | | 2003/0233334 A1 | 12/2003 | Smith |
| 2003/0014357 A1 | 1/2003 | Chrisekos et al. | | 2003/0236704 A1 | 12/2003 | Antonucci |
| 2003/0014891 A1 | 1/2003 | Nelms et al. | | 2004/0006497 A1 | 1/2004 | Nestor et al. |
| 2003/0018532 A1 | 1/2003 | Dudek et al. | | 2004/0006539 A1 | 1/2004 | Royer et al. |
| 2003/0025600 A1 | 2/2003 | Blanchard | | 2004/0010462 A1 | 1/2004 | Moon et al. |
| 2003/0028481 A1 | 2/2003 | Flitcroft et al. | | 2004/0011877 A1 | 1/2004 | Reppermund |
| 2003/0033697 A1 | 2/2003 | Hicks et al. | | 2004/0014457 A1 | 1/2004 | Stevens |
| 2003/0037264 A1 | 2/2003 | Ezaki et al. | | 2004/0015451 A1 | 1/2004 | Sahota et al. |
| 2003/0037851 A1 | 2/2003 | Hogganvik | | 2004/0016796 A1 | 1/2004 | Hanna et al. |
| 2003/0046228 A1 | 3/2003 | Berney | | 2004/0017934 A1 | 1/2004 | Kocher |
| 2003/0046237 A1 | 3/2003 | Uberti | | 2004/0019494 A1 | 1/2004 | Ridgeway et al. |
| 2003/0046540 A1 | 3/2003 | Nakamura et al. | | 2004/0019564 A1 | 1/2004 | Goldthwaite et al. |
| 2003/0047482 A1 | 3/2003 | Jones et al. | | 2004/0020982 A1 | 2/2004 | Hoffman et al. |
| 2003/0055727 A1 | 3/2003 | Walker et al. | | 2004/0021552 A1 | 2/2004 | Koo |
| 2003/0057226 A1 | 3/2003 | Long | | 2004/0024694 A1 | 2/2004 | Lawrence et al. |
| 2003/0057278 A1 | 3/2003 | Wong | | 2004/0026518 A1 | 2/2004 | Kudo et al. |
| 2003/0061172 A1 | 3/2003 | Robinson | | 2004/0029569 A1 | 2/2004 | Khan et al. |
| 2003/0069828 A1 | 4/2003 | Blazey et al. | | 2004/0030601 A1 | 2/2004 | Pond et al. |
| 2003/0069846 A1 | 4/2003 | Marcon | | 2004/0031856 A1 | 2/2004 | Atsmon et al. |
| 2003/0074317 A1 | 4/2003 | Hofi | | 2004/0039814 A1 | 2/2004 | Crabtree et al. |
| 2003/0083015 A1* | 5/2003 | Palin et al. .................... 455/67.1 | | 2004/0039860 A1 | 2/2004 | Mills et al. |
| 2003/0086591 A1 | 5/2003 | Simon | | 2004/0041021 A1 | 3/2004 | Nugent, Jr. |
| 2003/0093187 A1 | 5/2003 | Walker | | 2004/0041690 A1 | 3/2004 | Yamagishi |
| 2003/0097344 A1 | 5/2003 | Chaum et al. | | 2004/0044627 A1 | 3/2004 | Russell et al. |
| 2003/0106935 A1 | 6/2003 | Burchette, Jr. | | 2004/0046034 A1 | 3/2004 | Ey Yamani et al. |
| 2003/0112120 A1 | 6/2003 | Seifert | | 2004/0049687 A1 | 3/2004 | Orsini |
| 2003/0112972 A1 | 6/2003 | Hattick et al. | | 2004/0050930 A1 | 3/2004 | Rowe |
| 2003/0115126 A1 | 6/2003 | Pitroda | | 2004/0052406 A1 | 3/2004 | Brooks |
| 2003/0120554 A1 | 6/2003 | Hogan et al. | | 2004/0059923 A1 | 3/2004 | ShamRao |
| 2003/0120626 A1 | 6/2003 | Piotrowski | | 2004/0061593 A1 | 4/2004 | Lane |
| 2003/0121969 A1 | 7/2003 | Wankmueller | | 2004/0062423 A1 | 4/2004 | Doi |
| 2003/0122120 A1 | 7/2003 | Brazis et al. | | 2004/0073792 A1 | 4/2004 | Noble et al. |
| 2003/0123714 A1 | 7/2003 | O'Gorman et al. | | 2004/0083184 A1 | 4/2004 | Tsuei et al. |
| 2003/0124294 A1 | 7/2003 | Hodson et al. | | 2004/0083380 A1 | 4/2004 | Janke |
| 2003/0125054 A1 | 7/2003 | Garcia | | 2004/0084524 A1 | 5/2004 | Ramachandran |
| 2003/0130820 A1 | 7/2003 | Lane, III | | 2004/0089724 A1 | 5/2004 | Lasch et al. |
| 2003/0132132 A1 | 7/2003 | Small | | 2004/0098336 A1 | 5/2004 | Flink |
| 2003/0132284 A1 | 7/2003 | Reynolds et al. | | 2004/0104266 A1 | 6/2004 | Bolle et al. |
| 2003/0132297 A1 | 7/2003 | McCall et al. | | 2004/0104268 A1 | 6/2004 | Bailey et al. |
| 2003/0140228 A1 | 7/2003 | Binder | | 2004/0118930 A1 | 6/2004 | Berardi et al. |
| 2003/0149661 A1 | 8/2003 | Mitchell et al. | | 2004/0124104 A1 | 7/2004 | DeVolpi |
| 2003/0149662 A1 | 8/2003 | Shore | | 2004/0124246 A1 | 7/2004 | Allen et al. |
| 2003/0150911 A1 | 8/2003 | Joseph | | 2004/0127256 A1 | 7/2004 | Goldthwaite et al. |
| 2003/0152252 A1 | 8/2003 | Kondo et al. | | 2004/0129787 A1 | 7/2004 | Saito et al. |
| 2003/0153356 A1 | 8/2003 | Liu et al. | | 2004/0131237 A1 | 7/2004 | Machida |
| 2003/0155416 A1 | 8/2003 | Macklin et al. | | 2004/0133787 A1 | 7/2004 | Doughty et al. |
| 2003/0159044 A1 | 8/2003 | Doyle et al. | | 2004/0136573 A1 | 7/2004 | Sato |
| 2003/0160074 A1 | 8/2003 | Pineda | | 2004/0139021 A1 | 7/2004 | Reed et al. |
| 2003/0163699 A1 | 8/2003 | Pailles et al. | | 2004/0144841 A1 | 7/2004 | Tsukamoto et al. |
| 2003/0167207 A1 | 9/2003 | Berardi et al. | | 2004/0144846 A1 | 7/2004 | Lasch et al. |
| 2003/0173408 A1 | 9/2003 | Mosher, Jr. et al. | | 2004/0149820 A1 | 8/2004 | Zuili |

| Pub. No. | Date | Inventor |
|---|---|---|
| 2004/0155101 A1 | 8/2004 | Royer et al. |
| 2004/0158723 A1 | 8/2004 | Root |
| 2004/0160310 A1 | 8/2004 | Chen et al. |
| 2004/0161135 A1 | 8/2004 | Sano et al. |
| 2004/0165753 A1 | 8/2004 | Takhiri et al. |
| 2004/0169071 A1 | 9/2004 | Burgan et al. |
| 2004/0172541 A1 | 9/2004 | Ando et al. |
| 2004/0176071 A1 | 9/2004 | Gehrmann et al. |
| 2004/0177045 A1 | 9/2004 | Brown |
| 2004/0180657 A1 | 9/2004 | Yaqub et al. |
| 2004/0188519 A1 | 9/2004 | Cassone |
| 2004/0190757 A1 | 9/2004 | Murphy et al. |
| 2004/0193676 A1 | 9/2004 | Marks |
| 2004/0195314 A1 | 10/2004 | Lee |
| 2004/0199469 A1 | 10/2004 | Barillova et al. |
| 2004/0202354 A1 | 10/2004 | Togino |
| 2004/0208343 A1 | 10/2004 | Golden et al. |
| 2004/0215575 A1 | 10/2004 | Garrity |
| 2004/0222803 A1 | 11/2004 | Tartagni |
| 2004/0230488 A1 | 11/2004 | Beenau et al. |
| 2004/0232220 A1 | 11/2004 | Beenau et al. |
| 2004/0232224 A1 | 11/2004 | Beenau et al. |
| 2004/0233039 A1 | 11/2004 | Beenau et al. |
| 2004/0235450 A1 | 11/2004 | Rosenberg |
| 2004/0236699 A1 | 11/2004 | Beenau et al. |
| 2004/0236700 A1 | 11/2004 | Beenau et al. |
| 2004/0236701 A1 | 11/2004 | Beenau et al. |
| 2004/0236819 A1 * | 11/2004 | Anati et al. .................. 709/200 |
| 2004/0239480 A1 | 12/2004 | Beenau et al. |
| 2004/0240711 A1 | 12/2004 | Hamza et al. |
| 2004/0255168 A1 | 12/2004 | Murashita et al. |
| 2004/0257196 A1 | 12/2004 | Kotzin |
| 2004/0258282 A1 | 12/2004 | Bjorn et al. |
| 2005/0001711 A1 | 1/2005 | Doughty et al. |
| 2005/0004921 A1 | 1/2005 | Beenau et al. |
| 2005/0005172 A1 | 1/2005 | Haala |
| 2005/0011776 A1 | 1/2005 | Nagel |
| 2005/0017068 A1 | 1/2005 | Zalewski et al. |
| 2005/0018658 A1 | 1/2005 | Ikeda et al. |
| 2005/0020304 A1 | 1/2005 | Shinzaki |
| 2005/0021457 A1 | 1/2005 | Johnson et al. |
| 2005/0023157 A1 | 2/2005 | Logan |
| 2005/0033686 A1 | 2/2005 | Peart et al. |
| 2005/0033687 A1 | 2/2005 | Beenau et al. |
| 2005/0033688 A1 | 2/2005 | Pert et al. |
| 2005/0033689 A1 | 2/2005 | Bonalle et al. |
| 2005/0033992 A1 | 2/2005 | Inabe |
| 2005/0035192 A1 | 2/2005 | Bonalle et al. |
| 2005/0035847 A1 | 2/2005 | Bonalle et al. |
| 2005/0036665 A1 | 2/2005 | Higuchi |
| 2005/0038718 A1 | 2/2005 | Barnes et al. |
| 2005/0040221 A1 | 2/2005 | Schwarz, Jr. |
| 2005/0040272 A1 | 2/2005 | Argumedo et al. |
| 2005/0045718 A1 | 3/2005 | Bortolin et al. |
| 2005/0050367 A1 | 3/2005 | Burger et al. |
| 2005/0054438 A1 | 3/2005 | Rothschild et al. |
| 2005/0058262 A1 | 3/2005 | Timmins et al. |
| 2005/0060233 A1 | 3/2005 | Bonalle et al. |
| 2005/0065842 A1 | 3/2005 | Summers |
| 2005/0065872 A1 | 3/2005 | Moebs et al. |
| 2005/0071231 A1 | 3/2005 | Beenau et al. |
| 2005/0087597 A1 | 4/2005 | Gotfried et al. |
| 2005/0091325 A1 | 4/2005 | Kuwana et al. |
| 2005/0097038 A1 | 5/2005 | Yu et al. |
| 2005/0098621 A1 | 5/2005 | deSylva |
| 2005/0100199 A1 | 5/2005 | Boshra |
| 2005/0102524 A1 | 5/2005 | Haala |
| 2005/0103839 A1 | 5/2005 | Hewel |
| 2005/0109836 A1 | 5/2005 | Ben-Aissa |
| 2005/0113137 A1 | 5/2005 | Rodriguez et al. |
| 2005/0116024 A1 | 6/2005 | Beenau et al. |
| 2005/0119978 A1 | 6/2005 | Ates |
| 2005/0121512 A1 | 6/2005 | Wankmueller |
| 2005/0122209 A1 | 6/2005 | Black |
| 2005/0123137 A1 | 6/2005 | McCallum |
| 2005/0125312 A1 | 6/2005 | Dearing et al. |
| 2005/0125343 A1 | 6/2005 | Mendelovich |
| 2005/0127164 A1 | 6/2005 | Wankmueller |
| 2005/0137977 A1 | 6/2005 | Wankmueller |
| 2005/0139669 A1 | 6/2005 | Arnouse |
| 2005/0144133 A1 | 6/2005 | Hoffman et al. |
| 2005/0149358 A1 | 7/2005 | Sacco et al. |
| 2005/0149926 A1 | 7/2005 | Saltz |
| 2005/0160271 A9 | 7/2005 | Brundage et al. |
| 2005/0160790 A1 | 7/2005 | Tanaka et al. |
| 2005/0165684 A1 | 7/2005 | Jensen et al. |
| 2005/0166062 A1 | 7/2005 | Sanchez-Cifuentes |
| 2005/0169504 A1 | 8/2005 | Black |
| 2005/0171787 A1 | 8/2005 | Zagami |
| 2005/0171905 A1 | 8/2005 | Wankmueller |
| 2005/0180618 A1 | 8/2005 | Black |
| 2005/0187883 A1 | 8/2005 | Bishop et al. |
| 2005/0187916 A1 | 8/2005 | Levin et al. |
| 2005/0197923 A1 | 9/2005 | Kilner et al. |
| 2005/0203857 A1 | 9/2005 | Friedman |
| 2005/0207002 A1 | 9/2005 | Liu et al. |
| 2005/0211784 A1 | 9/2005 | Justin |
| 2005/0212657 A1 | 9/2005 | Simon |
| 2005/0216424 A1 | 9/2005 | Gandre et al. |
| 2005/0221853 A1 | 10/2005 | Silvester |
| 2005/0223230 A1 * | 10/2005 | Zick .......................... 713/171 |
| 2005/0232471 A1 | 10/2005 | Baer |
| 2005/0240778 A1 | 10/2005 | Saito |
| 2005/0246292 A1 | 11/2005 | Sarcanin |
| 2005/0251688 A1 | 11/2005 | Nanavati et al. |
| 2005/0261972 A1 | 11/2005 | Black |
| 2005/0275505 A1 | 12/2005 | Himmelstein |
| 2005/0278222 A1 | 12/2005 | Northrup |
| 2006/0000892 A1 | 1/2006 | Bonalle et al. |
| 2006/0000893 A1 | 1/2006 | Bonalle et al. |
| 2006/0000894 A1 | 1/2006 | Bonalle et al. |
| 2006/0000895 A1 | 1/2006 | Bonalle et al. |
| 2006/0000896 A1 | 1/2006 | Bonalle et al. |
| 2006/0000897 A1 | 1/2006 | Bonalle et al. |
| 2006/0000898 A1 | 1/2006 | Bonalle et al. |
| 2006/0000899 A1 | 1/2006 | Bonalle et al. |
| 2006/0005022 A1 | 1/2006 | Wakamori et al. |
| 2006/0005042 A1 | 1/2006 | Black |
| 2006/0016868 A1 | 1/2006 | Bonalle et al. |
| 2006/0016869 A1 | 1/2006 | Bonalle et al. |
| 2006/0016871 A1 | 1/2006 | Bonalle et al. |
| 2006/0016874 A1 | 1/2006 | Bonalle et al. |
| 2006/0016875 A1 | 1/2006 | Bonalle et al. |
| 2006/0016877 A1 | 1/2006 | Bonalle et al. |
| 2006/0033609 A1 | 2/2006 | Bridgelall |
| 2006/0034492 A1 | 2/2006 | Siegel et al. |
| 2006/0066444 A1 | 3/2006 | Steeves |
| 2006/0069635 A1 | 3/2006 | Ram et al. |
| 2006/0071756 A1 | 4/2006 | Steeves |
| 2006/0080552 A1 | 4/2006 | Lauper |
| 2006/0095369 A1 | 5/2006 | Hofi |
| 2006/0104485 A1 | 5/2006 | Miller et al. |
| 2006/0123240 A1 | 6/2006 | Chaiken |
| 2006/0136336 A1 | 6/2006 | Drummond et al. |
| 2006/0156395 A1 | 7/2006 | Fontaine |
| 2006/0158434 A1 | 7/2006 | Zank et al. |
| 2006/0173291 A1 | 8/2006 | Glossop |
| 2006/0173791 A1 | 8/2006 | Mann et al. |
| 2006/0177061 A1 | 8/2006 | Orsini et al. |
| 2006/0178937 A1 | 8/2006 | Rau et al. |
| 2006/0190419 A1 | 8/2006 | Bunn et al. |
| 2006/0202835 A1 | 9/2006 | Thibault |
| 2006/0208066 A1 | 9/2006 | Finn et al. |
| 2006/0213986 A1 | 9/2006 | Register et al. |
| 2006/0229988 A1 | 10/2006 | Oshima et al. |
| 2006/0237528 A1 | 10/2006 | Bishop et al. |
| 2006/0242423 A1 | 10/2006 | Kussmaul |
| 2006/0278723 A1 | 12/2006 | Dan et al. |
| 2007/0008131 A1 | 1/2007 | Doan et al. |
| 2007/0046468 A1 | 3/2007 | Davis |
| 2007/0057797 A1 | 3/2007 | Waldner et al. |
| 2007/0075841 A1 | 4/2007 | Maltsev et al. |
| 2007/0112957 A1 | 5/2007 | Shastri et al. |
| 2007/0119924 A1 | 5/2007 | Register et al. |
| 2007/0241861 A1 | 10/2007 | Venkatanna et al. |
| 2007/0252001 A1 | 11/2007 | Kail et al. |
| 2007/0252010 A1 | 11/2007 | Gonzalez et al. |
| 2007/0284432 A1 | 12/2007 | Abouyounes |

| | | | | | | |
|---|---|---|---|---|---|---|
| 2007/0296544 | A1 | 12/2007 | Beenau et al. | GB | 2 108 906 A | 5/1983 |
| 2007/0296551 | A1 | 12/2007 | Beenau et al. | GB | 2240948 | 8/1991 |
| 2007/0299782 | A1 | 12/2007 | Beenau et al. | GB | 2281714 | 3/1995 |
| 2007/0299783 | A1 | 12/2007 | Beenau et al. | GB | 2347537 | 9/2000 |
| 2008/0006691 | A1 | 1/2008 | Bonalle et al. | GB | 2350021 | 11/2000 |
| 2008/0008359 | A1 | 1/2008 | Beenau et al. | GB | 2361790 | 10/2001 |
| 2008/0008363 | A1 | 1/2008 | Bonalle et al. | JP | 61-100436 | 5/1986 |
| 2008/0010214 | A1 | 1/2008 | Bonalle et al. | JP | 62-43774 | 3/1987 |
| 2008/0010218 | A1* | 1/2008 | Zank .............................. 705/75 | JP | 62-264999 | 11/1987 |
| 2008/0011830 | A1 | 1/2008 | Bonalle et al. | JP | 63-071794 | 4/1988 |
| 2008/0011831 | A1 | 1/2008 | Bonalle et al. | JP | 63-098689 | 4/1988 |
| 2008/0013796 | A1 | 1/2008 | Bonalle et al. | JP | 63-72721 | 5/1988 |
| 2008/0013807 | A1 | 1/2008 | Bonalle et al. | JP | 63-175987 | 7/1988 |
| 2008/0015941 | A1 | 1/2008 | Beenau et al. | JP | 64-004934 | 1/1989 |
| 2008/0015992 | A1 | 1/2008 | Bonalle et al. | JP | 64-087395 | 3/1989 |
| 2008/0015993 | A1 | 1/2008 | Bonalle et al. | JP | 64-087396 | 3/1989 |
| 2008/0015994 | A1 | 1/2008 | Bonalle et al. | JP | 64-087397 | 3/1989 |
| 2008/0016002 | A1 | 1/2008 | Beenau et al. | JP | 02-130737 | 5/1990 |
| 2008/0033722 | A1 | 2/2008 | Beenau et al. | JP | 02-252149 | 10/1990 |
| 2008/0067242 | A1 | 3/2008 | Bonalle et al. | JP | 03-290 780 | 12/1991 |
| 2008/0072065 | A1 | 3/2008 | Bonalle et al. | JP | 42-005596 | 7/1992 |
| | | | | JP | 04-303692 | 10/1992 |
| FOREIGN PATENT DOCUMENTS | | | | JP | 05-069689 | 3/1993 |
| CH | | 689070 | 8/1988 | JP | 05-254283 | 10/1993 |
| CH | | 689070 | 8/1997 | JP | 06-183187 | 7/1994 |
| CH | | 689680 | 8/1999 | JP | 06-191137 | 7/1994 |
| DE | | 2847756 | 5/1980 | JP | 06-234287 | 8/1994 |
| DE | | 3636921 | 5/1981 | JP | 07-173358 | 7/1995 |
| DE | | 3941070 | 6/1991 | JP | 07-205569 | 8/1995 |
| DE | | 4339460 | 11/1993 | JP | 08-244385 | 9/1996 |
| DE | | 29702538 | 4/1997 | JP | 08-324163 | 12/1996 |
| DE | | 19741726 | 9/1997 | JP | 09-050505 | 2/1997 |
| DE | | 10203926 | 1/2002 | JP | 09-052240 | 2/1997 |
| EP | | 0 181 770 | 5/1986 | JP | 09-274640 | 10/1997 |
| EP | | 0 343 829 A2 | 11/1989 | JP | 10-129161 | 5/1998 |
| EP | | 0 354 817 B1 | 2/1990 | JP | 10-289296 | 10/1998 |
| EP | | 0358525 | 3/1990 | JP | 10-334206 | 12/1998 |
| EP | | 0 368 570 A2 | 5/1990 | JP | 10-340231 | 12/1998 |
| EP | | 0 424 726 | 9/1990 | JP | 11-175640 | 7/1999 |
| EP | | 0388090 | 9/1990 | JP | 11-227367 | 8/1999 |
| EP | | 0424726 | 10/1990 | JP | 11-353425 | 12/1999 |
| EP | | 0 424 726 | 12/1990 | JP | 2000015288 | 1/2000 |
| EP | | 0403134 | 12/1990 | JP | 2000-048153 | 2/2000 |
| EP | | 0 411 602 | 2/1991 | JP | 2000040181 | 2/2000 |
| EP | | 0 473 998 A2 | 3/1992 | JP | 2000067312 | 3/2000 |
| EP | | 0 481 388 B1 | 4/1992 | JP | 2000-163538 | 6/2000 |
| EP | | 0 531 605 B1 | 3/1993 | JP | 2000-177229 | 6/2000 |
| EP | | 0 552 047 B1 | 7/1993 | JP | 2000-194799 | 7/2000 |
| EP | | 0 560 318 B1 | 9/1993 | JP | 2000207641 | 7/2000 |
| EP | | 0 568 185 B1 | 11/1993 | JP | 2000-222176 | 8/2000 |
| EP | | 0 657 297 B1 | 6/1995 | JP | 2000-252854 | 9/2000 |
| EP | | 0 721 850 A2 | 7/1996 | JP | 20015931 | 1/2001 |
| EP | | 0735505 | 10/1996 | JP | 2001-504406 | 4/2001 |
| EP | | 0780839 | 6/1997 | JP | 2001-134536 | 5/2001 |
| EP | | 0 789 316 B1 | 8/1997 | JP | 2001-160105 | 6/2001 |
| EP | | 0854461 | 7/1998 | JP | 2001283122 | 10/2001 |
| EP | | 0 866 420 A2 | 9/1998 | JP | 2001-315475 | 11/2001 |
| EP | | 0 894 620 A1 | 2/1999 | JP | 2002-032687 | 1/2002 |
| EP | | 0 916 519 | 5/1999 | JP | 2002-109584 | 4/2002 |
| EP | | 0917120 | 5/1999 | JP | 2002-133335 | 5/2002 |
| EP | | 0927945 | 7/1999 | JP | 2002-133336 | 5/2002 |
| EP | | 0933717 | 8/1999 | JP | 2002-157530 | 5/2002 |
| EP | | 0949595 | 10/1999 | JP | 2002-163585 | 6/2002 |
| EP | | 0956818 | 11/1999 | JP | 2002-183443 | 6/2002 |
| EP | | 0959440 | 11/1999 | JP | 2002-274087 | 9/2002 |
| EP | | 200011109 | 1/2000 | JP | 2003-288646 | 10/2003 |
| EP | | 0984404 | 3/2000 | JP | 2004-164347 | 6/2004 |
| EP | | 1016947 | 7/2000 | JP | 2004-348478 | 12/2004 |
| EP | | 1017030 | 7/2000 | WO | WO 81/00776 | 3/1981 |
| EP | | 1039403 | 9/2000 | WO | WO 89/03760 | 5/1989 |
| EP | | 1104909 | 6/2001 | WO | WO 90/08661 | 8/1990 |
| EP | | 1113387 | 7/2001 | WO | WO 91/08910 | 6/1991 |
| EP | | 1115095 | 7/2001 | WO | WO 92/16913 | 10/1992 |
| EP | | 1199684 | 4/2002 | WO | 9532919 | 12/1995 |
| EP | | 1251450 | 10/2002 | WO | WO 95/35546 | 12/1995 |
| EP | | 1345146 | 9/2003 | WO | WO 96/06409 | 2/1996 |
| EP | | 1610273 | 12/2005 | WO | WO 96/18972 | 6/1996 |
| GB | | 1 371 254 | 10/1974 | WO | WO 97/09688 | 3/1997 |
| GB | | 2088110 | 6/1982 | WO | WO 97/40459 | 10/1997 |

| | | |
|---|---|---|
| WO | WO 98/21683 | 5/1998 |
| WO | WO 98/22291 | 5/1998 |
| WO | WO 98/45778 | 10/1998 |
| WO | 9903057 | 1/1999 |
| WO | WO 99/12136 | 3/1999 |
| WO | WO 99/14055 | 3/1999 |
| WO | WO 99/21321 | 4/1999 |
| WO | WO 99/27492 | 6/1999 |
| WO | WO 99/40548 | 8/1999 |
| WO | WO 99/47983 | 9/1999 |
| WO | WO 99/49424 | 9/1999 |
| WO | 0010144 | 2/2000 |
| WO | 0038088 | 6/2000 |
| WO | WO 00/49586 | 8/2000 |
| WO | WO 00/73989 | 12/2000 |
| WO | 0104825 | 1/2001 |
| WO | WO 01/13320 | 2/2001 |
| WO | 0115098 | 3/2001 |
| WO | WO 01/18745 | 3/2001 |
| WO | WO 01/25872 | 4/2001 |
| WO | 0143095 | 6/2001 |
| WO | WO 01/55955 | 8/2001 |
| WO | 0172224 | 10/2001 |
| WO | 0177856 | 10/2001 |
| WO | 0180473 | 10/2001 |
| WO | WO 01/78024 | 10/2001 |
| WO | 0186535 | 11/2001 |
| WO | 0190962 | 11/2001 |
| WO | WO 01/86599 | 11/2001 |
| WO | 0195243 | 12/2001 |
| WO | 0201485 | 1/2002 |
| WO | 0213134 | 2/2002 |
| WO | 0221903 | 3/2002 |
| WO | 02063545 | 8/2002 |
| WO | 02065246 | 8/2002 |
| WO | 02065404 | 8/2002 |
| WO | WO 02/067190 | 8/2002 |
| WO | 02069221 | 9/2002 |
| WO | 02073512 | 9/2002 |
| WO | 02086665 | 10/2002 |
| WO | 02091281 | 11/2002 |
| WO | 02097575 | 12/2002 |
| WO | 02101670 | 12/2002 |
| WO | WO 03/007623 | 1/2003 |
| WO | WO 2004/052657 | 6/2004 |

OTHER PUBLICATIONS

White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
"The Bank Credit Card Business", American Bankers Association, 1996, all pages.*
Menezes et al., "Handbook of Applied Cryptography", 1997, CRC Press LLC, chapter 5.*
Rankl et al., "Smart Card Handbook," Second Edition, 2000, Wiley & Sons, all pages.*
Menezes et al., "Handbook of Applied Cryptography," 1997, CRC Press LLC, chapter 5.*
Financial Technology International Bulletin, V14, n1 , p. 4, Sep. 1996.
Green, Thomas C., "American Express Offers temporary CC numbers for the web," Sep. 9, 2000, The Register, www.theregister.c.uk/c.
CNN.com, U.S. News, "American Express to offer disposable credit card numbers," Sep. 8, 2000, Associated Press, www.cnn.c.
ISO/IEC 7816-6:1996(E)—First Edition—May 15, 1996.
ISO/IEC 7816-4: 1995(E)—First Edition—Sep. 1, 1995.
Sony, Phillips to Test RFID Platform, RFID Journal, May 8, 2003.
USBanker, Article 5, 1995, http://www.banking.com/us-banker/art5.
"Physical Reality: A Second Look", Ken Sharp, Senior Technical Editor, http://www.idsystems.com/reader/1999_03/phys0399_pt2/phys0399_pt2.htm (6 pages).
"Magic Wands' to Speed Mobile Sales", Bob Brewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti..com/tiris/docs/news_releases/rel12.htm (3 pages).
"Speedpass Unleashed", Jun. 4, 2002, http://www.cardweb.com/cardtrak/news/cf2_20a_97.html (2 pages).
Prophecy Central Update #9, Oct. 10, 1997, http://www/bible-prophecy.com/pcu9.htm (5 pages).
International newsletter of the TI RFID Group, Issue 20, 2000 (12 pages).
"CES: Microsoft's SPOT Technology Has Humble Origins", by James Niccolai, Jan. 10, 2003, http://archive,inforworld.com/articles/hn/sml/03/01/10/03011hnspot.xml?s=IDGNS (3 pages).
"Microsoft: See SPOT Run on Your Wrist", by Richard Shim, Jun. 5, 2003, http://news.com.com.2100-1041_3-101442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its Quick Wave RFID payment card for another three months", RFID Journal, Jan. 23, 2003.
"MasterCard to Test RFID Card: Pilot will test whether consumers, merchants and credit card issuers value contactless payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Phillips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has released of Java version of its NTRU encryption algorithm", RFID Journal, Jun. 27, 2002.
"Making RFID Payments Ubiquitous: Phillips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embraces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MF1 S50, Philips Semiconductors, Product Specification Rev. 5.1 May 2001.
U.S. Appl. No. 60/395,606, filed Jul. 15, 2002.
Non-Final Office Action issued Apr. 20, 2005 in U.S. Appl. No. 10/192,488.
Final Office Action issued Sep. 8, 2005 in U.S. Appl. No. 10/192,488.
Advisory Action issued Nov. 10, 2005 in U.S. Appl. No. 10/192,488.
Non-Final Office Action issued Jan. 18, 2006 in U.S. Appl. No. 10/192,488.
Final Office Action issued Sep. 25, 2006 in U.S. Appl. No. 10/192,488.
Notice of Allowance issued Feb. 2, 2007 in U.S. Appl. No. 10/192,488.
Examiner's Report dated Oct. 5, 2006 for AU2002318293.
Office Action dated Jun. 28, 2007 in CA 2,452,351.
Office Action dated Apr. 25, 2008 in CA 2,452,351.
Supplemental Search Report dated Nov. 16, 2004 for EP02748120.9.

Examination Report dated Mar. 8, 2005 for EP02748120.9.
Examination Report dated Feb. 8, 2006 for EP02748120.9.
Examination Report dated Oct. 24, 2007 for EP02748120.9.
Office Action dated Mar. 9, 2006 in JP2003-513257.
Office Action dated Oct. 20, 2006 in JP2003-513257.
Office Action dated Aug. 1, 2007 in JP2003-513257.
Office Action dated Jan. 29, 2008 in JP2003-513257.
Office Action dated Jul. 11, 2007 for MX PA/a/2004/000253.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
Ex-Parte Quayle Action issued Jun. 6, 2005 in U.S. Appl. No. 10/710,484.
Notice of Allowance issued Aug. 2, 2005 in U.S. Appl. No. 10/710,484.
Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.

Notice of Abandonment issued Jan. 5, 2007 in U.S. Appl. No. 10/708,826.
Non-Final Office Action issued Jan. 10, 2006 in U.S. Appl. No. 10/708,827.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.
Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Advisory Action issued Mar. 8, 2006 in U.S. Appl. No. 10/710,335.
Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
ISR/WO dated Jul. 9, 2008 for PCT/US06/45362.
Non-Final Office Action issued Jun. 24, 2008 in U.S. Appl. No. 11/161,295.
Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Notice of Allowance issued Aug. 11, 2006 in U.S. Appl. No. 10/906,732.
Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Notice of Allowance issued May 8, 2006 in U.S. Appl. No. 10/708,549.
Non-Final Office Action issued May 17, 2007 in U.S. Appl. No. 10/810,469.
Final Office Action issued Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Non-Final Office Action issued May 2, 2006 in U.S. Appl. No. 10/710,307.
Final Office Action issued Oct. 10, 2006 in U.S. Appl. No. 10/710,307.
Advisory Action issued Jan. 5, 2007 in U.S. Appl. No. 10/710,307.
Non-Final Office Action issued Apr. 10, 2007 in U.S. Appl. No. 10/710,307.
Notice of Allowance issued Oct. 4, 2007 in U.S. Appl. No. 10/710,307.
Supplemental Notice of Allowance issued Nov. 8, 2007 in U.S. Serial No. 710,307.

Office Action dated Mar. 6, 2008 for AU2005270228.
Office Action dated Jun. 18, 2008 for AU2005270228.
Office Action dated Apr. 14, 2008 for CA2570739.
ISR/WO dated Oct. 10, 2006 for PCT/US05/19388.
IPRP dated Mar. 15, 2007 for PCT/US05/19388.
Non-Final Office Action issued Feb. 26, 2008 in U.S. Appl. No. 11/859,153.
Notice of Allowance issued Jun. 20, 2008 in U.S. Appl. No. 11/859,153.
Examination Report dated Jun. 22, 2007 for GB 0700319.7.
Examination Report dated Nov. 22, 2007 for GB 0700319.7.
Search Report dated May 23, 2008 for GB 0700319.7.
Non-Final Office Action issued Feb. 26, 2008 in U.S. Appl. No. 11/859,171.
Notice of Allowance issued Jun. 19, 2008 in U.S. Appl. No. 11/859,171.
Examination Report dated Jun. 16, 2008 for SG200608843-9.
Non-Final Office Action issued Jul. 29, 2005 in U.S. Appl. No. 10/710,308.
Final Office Action issued Nov. 29, 2005 in U.S. Appl. No. 10/710,308.
Advisory Action issued Feb. 10, 2006 in U.S. Appl. No. 10/710,308.
Non-Final Office Action issued May 2, 2006 in U.S. Appl. No. 10/710,308.
Final Office Action issued Oct. 10, 2006 in U.S. Appl. No. 10/710,308.
Advisory Action issued Jan. 8, 2007 in U.S. Appl. No. 10/710,308.
Non-Final Office Action issued May 1, 2007 in U.S. Appl. No. 10/710,308.
Notice of Allowance issued Sep. 26, 2007 in U.S. Appl. No. 10/710,308.
Supplemental Notice of Allowance issued Dec. 11, 2007 in U.S. Appl. No. 10/710,308.
Non-Final Office Action issued Mar. 18, 2008 in U.S. Appl. No. 11/860,704.
Notice of Allowance issued Jul. 3, 2008 in U.S. Appl. No. 11/860,704.
Non-Final Office Action issued Apr. 3, 2008 in U.S. Appl. No. 11/860,726.
Notice of Allowance issued Jul. 14, 2008 in U.S. Appl. No. 11/860,726.
Non-Final Office Action issued Jul. 19, 2005 in U.S. Appl. No. 10/710,309.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.
Notice of Allowance issued Sep. 24, 2007 in U.S. Appl. No. 10/611,563.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Final Office Action issued Nov. 21, 2005 in U.S. Appl. No. 10/710,309.
Advisory Action issued Feb. 10, 2006 in U.S. Appl. No. 10/710,309.
Non-Final Office Action issued May 2, 2006 in U.S. Appl. No. 10/710,309.
Notice of Abandonment issued Dec. 19, 2006 in U.S. Appl. No. 10/710,309.
Non-Final Office Action issued May 6, 2005 in U.S. Appl. No. 10/710,310.
Final Office Action issued Oct. 19, 2005 in U.S. Appl. No. 10/710,310.
Advisory Action issued Dec. 29, 2005 in U.S. Appl. No. 10/710,310.
Non-Final Office Action issued Apr. 5, 2006 in U.S. Appl. No. 10/710,310.
Notice of Abandonment issued Oct. 20, 2006 in U.S. Appl. No. 10/710,310.

Non-Final Office Action issued Sep. 19, 2006 in U.S. Appl. No. 10/710,311.
Notice of Abandonment issued Jun. 28, 2007 in U.S. Appl. No. 10/710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Non-Final Office Action issued May 1, 2008 in U.S. Appl. No. 11/861,347.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.
Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Office Action dated Jan. 27, 2005 in NZ530497.
ISR dated Dec. 30, 2002 for PCT/US02/0219903.
Office Action dated Dec. 30, 2005 for CN02813783.3.
Office Action dated May 16, 2007 for CN02813783.3.
Non-Final Office Action mailed Feb. 8, 2008 in U.S. Appl. No. 10/340,352.
Final Office Action mailed Jun. 13, 2008 in U.S. Appl. No. 10/340,352.
Advisory Action mailed Aug. 19, 2008 in U.S. Appl. No. 10/340,352.
Office Action dated Jan. 29, 2007 for CA2458143.
Office Action dated Dec. 19, 2007 for CA2458143.
Supplemental Search Report dated May 26, 2006 for EP03763325.2.
Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
Non-Final Office Action issued Dec. 13, 2007 in U.S. Appl. No. 10/318,432.
Non-Final Office Action issued Jun. 27, 2008 in U.S. Appl. No. 10/318,432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.

Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 17, 2006 in U.S. Appl. No. 10/708,823.
ISR issued May 22, 2008 in PCT/US06/045362.
Written Opinion issued Jul. 9, 2008 in PCT/US06/045362.
Notice of Allowance issued Mar. 3, 2009 in U.S. Appl. No. 11/161,295.
Non-Final Office Action issued Mar. 19, 2008 in U.S. Appl. No. 11/164,609.
Requirement for Restriction issued Jan. 12, 2009 in U.S. Appl. No. 11/552,886.
"The Evolution of Mobile Payment", by McPherson, Financial Insights, Feb. 2, 2004, http://www.banktech.com./story/mews/showArticle/jhtml?article ID=17601432, 2 pages.
"Pay By Touch Press Releases", http://www.paybytouch.com/press.html, Feb. 10, 2004, 3 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It By Ear", The Guardian, Jan. 18, 2003, http://money.guardian.co.uk/creditanddebt/creditcards/story/0,1456,876908,00.html, 3 pages.
Pay By Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com./reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris_html, Feb. 18, 2004, 2 pages.
"Individual Biometrics—Vascular Patterns", http:ctl.ncsc.dni.us/biomet%20web/BMVascular.html, Feb. 18, 2004, 1 page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 2 pages.
"Visual Speech and Speaker Recognition", by Luettin, Jun. 30, 2000, http://herens.idiap.ch/~luettin/luettin-thesis.bib.abs.html, 1 page.
"Automatic Ear Recognition by Force Field Transformations", by Hurley, et al., The Institution of Electrical Engineers, 2000, pp. 7/1-7/5.
"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.
"How Facial Recognition Systems Work", by Bonsor, http://computer.howstuffworks.com/facial-recognition.htm/printable, Feb. 18, 2004, 6 pages.
"Biometrics: Hand Geometry", by Ross, et al., http://biometrics.cse.msu.edu/hand_geometry.html, Feb. 26, 2004, 2 pages.
"Biometric Person Authentication: Odor", by Korotkaya, Department of Information Technology, Laboratory of Applied Mathematics, Lappeenranta University of Technology, 18 pages.
"ISO Magnetic Stripe Card Standards", http://www.cyberd.co.uk/support./technotes/ioscards.htm, Feb. 9, 2004, 4 pages.
"Smart Card Developer's Kit: Some Basic Standards for Smart Cards", http:unix.be.eu.org/docs/smart-card-developer-kit/ch03/033-035.html, Feb. 9, 2004, 2 pages.
"Smart Card Technology and Applications"; http://disc.cba.uh.edu/~rhirsch/fall96/lara.htm (8 pages).
Goldman, J., "Internet Security, The Next Generation, When Software Encryption is not Enough," Web Techniques, Nov. 1997, pp. 43-46.
Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
"ISO Standards," available from http://www.iso.ch/projects/loading.html.
Turban, et al., "Using Smartcards in Electronic Commerce," Proc. 31st Annual Hawaii Inter. Conf. on System Sciences, vol. 4, 1998, pp. 62-69.
Dhem, et al., "SCALPS: Smart Card for Limited Payment Systems," IEEE Micro, Jun. 1996, pp. 42-51.
Smith, M.T., "Smart Cards: Integrating for Portable Complexity," Computer-Integrated Engineering, Aug. 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," BYTE, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.
Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ssl3/draft302.txt).
Business Wire (press release), "Master Card E-Wallet," Jul. 11, 2000.
Obongo.com Website, "Obongo," Aug. 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.
http://www.semiconductors.phillips.com/news/content/file_878.html, Apr. 7, 2003.
http://www.palowireless.com/infotooth/whatis.asp, Apr. 28, 2003.
http://www.palowireless.com/infotooth/tutorial.asp, Apr. 28, 2003.

* cited by examiner

SYSTEM AND METHOD FOR GENERATING AN UNPREDICTABLE NUMBER USING A SEEDED ALGORITHM

CROSS-REFERENCE TO RELATED APPLICATIONS

This application is a continuation-in-part, and claims priority to, U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004 (which itself claims priority to U.S. Provisional Application No. 60/507,803, filed Sep. 30, 2003. This application is also a continuation-in-part of and claims priority to U.S. patent application Ser. No. 10/340, 352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002). This application is also a continuation-in-part and claims priority to U.S. patent application Ser. No. 10/192, 488, entitled "SYSTEM AND METHOD FOR PAYMENT USING RADIO FREQUENCY IDENTIFICATION IN CONTACT AND CONTACTLESS TRANSACTIONS," filed Jul. 9, 2002 now U.S. Pat. No. 7,239,226 (which itself claims priority to U.S. Provisional Patent Application No. 60/304,216, filed Jul. 10, 2001). All of the above-listed applications are incorporated herein by reference.

FIELD OF INVENTION

This invention generally relates to securing a transaction involving radio frequency identification (RFID) technology. More particularly, the invention relates to a system and method for securing the RFID enabled transaction using an unpredictable number generated by a seeded algorithm.

BACKGROUND OF INVENTION

Like barcode and voice data entry, RFID is a contactless information acquisition technology. RFID systems are wireless, and are usually extremely effective in hostile environments where conventional acquisition methods often fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical RFID fob is ordinarily a self-contained device, which may take the shape of any portable form factor. The RFID fob may include a transponder for transmitting information during a transaction. In some instances, a battery may be included in the fob to power the transponder, in which case the internal circuitry of the fob (including the transponder) may draw its operating power from the battery power source. Interrogation by the reader for activation of the fob is not required when using a battery source.

Alternatively, the fob may gain its operating power directly from a RF interrogation signal. U.S. Pat. No. 5,053,774, issued to Schuermann, describes a typical transponder RF interrogation system, which may be found in the prior art. The Schuermann patent generally describes the powering technology surrounding conventional transponder structures. U.S. Pat. No. 4,739,328 discusses a method by which a conventional transponder may respond to a RF interrogation signal. Other typical modulation techniques that may be used include, for example, ISO/IEC 14443 and the like. In the conventional fob powering technologies used, the fob is typically activated upon presenting the fob into an interrogation signal. In this regard, the fob may be activated irrespective of whether the user desires such activation.

One of the more visible uses of the RFID technology is the introduction of American Express' Expresspay®, Exxon/Mobil's Speedpass® and Shell's EasyPay® products. These products use transponders, placed in a fob or tag, which enable automatic identification of the user when the fob is presented at a merchant's point-of-sale (POS) device, for example, when attempting to complete a transaction. During the transaction completion, information from the RFID fob is ordinarily passed to the POS, which delivers the information to a merchant system.

To complete a typical transaction, fob identification data is passed to a third-party server database. The third-party server references the identification data to a consumer (e.g., user) credit or debit account. In an exemplary processing method, the third-party server seeks authorization for the transaction by passing the transaction and account data to an authorizing entity, such as for example an "acquirer" or account issuer. Once the server receives authorization from the authorizing entity, the authorizing entity sends clearance to the POS device for completion of the transaction.

To lessen the financial impact of fraudulent transactions in the RFID environment, fob issuers have focused much effort on securing RFID transactions. Many of the efforts have focused on securing the transaction account or related data during transmission from the user to the merchant, or from the merchant to a third-party server or account provider system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user or the RFID transaction device, wherein the associated number is stored in an account issuer database. If the PIN number provided by the device user matches the associated number, then the transaction may be cleared for completion.

One problem with the issuer's efforts in securing RFID transactions is that they are susceptible to eavesdropping and decrypting during transit, such as when transferred from the merchant system to the account issuer system. Such information may be sensitive information concerning the fob user or the fob user's account. Should the fob user's sensitive information be retrieved without authorization during transit, the fob user or issuer may be subjected to fraudulent activity.

As such, a need exists for a method of securing sensitive transaction account information, which permits the account provider, merchant system, or acquirer to have a significant influence on the security of the fob user information stored on a merchant system.

SUMMARY OF INVENTION

The invention includes a system and method for generating an unpredictable number using a seeded algorithm. The algorithm is seeded using a random 16-byte value used as a counter. The random 16-byte value is used in a pseudo random number generator to produce the unpredictable number.

In one embodiment, the random 16-byte value is generated from variable data. The variable data is subjected to a Secure Hashing Algorithm to produce a message digest. The left most, or right most 16 bytes of the message digest is selected as the random 16-byte value. In another embodiment, the random 16-byte value is used in a pseudo random number generator to produce the unpredictable number. A range of values for the unpredictable number is chosen, and the maximum value permitted for the unpredictable number is determined. A standard triple Data Encryption Standard (DES) operation is then performed on the random 16-byte value to produce the unpredictable number. In one exemplary embodiment, the unpredictable number is subjected to a mod function to trim the unpredictable value to the maximum value permitted.

BRIEF DESCRIPTION OF THE DRAWINGS

A more complete understanding of the present invention may be derived by referring to the detailed description and claims when considered in connection with the Figures. In the Figures, like numerals refer to similar elements, throughout.

DETAILED DESCRIPTION

The present invention is described herein in terms of various functional components and processing steps. It should be appreciated that such functional components and processing steps may be realized by any number of software, hardware or structural components configured to perform the specified functions. For example, the present invention may be practiced using various integrated circuit components (e.g., memory elements, digital signal processing elements, logic elements, look-up tables, and the like), which may perform a variety of functions under the control of one or more microprocessors.

Figure 1:
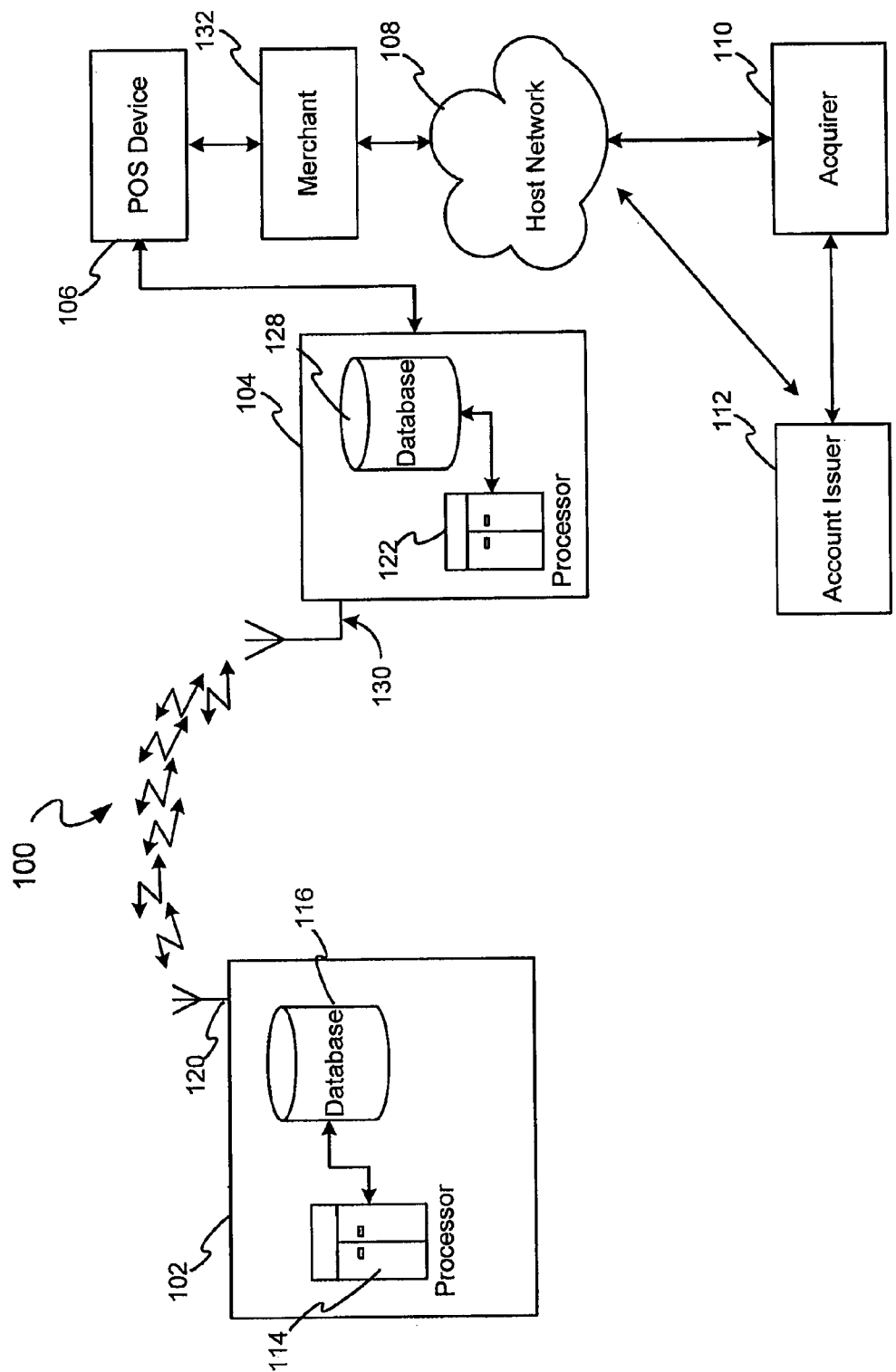
FIG. 1 illustrates an exemplary RFID-based system depicting exemplary components for use in RFID transaction completion in accordance with an embodiment of the present invention.

FIG. 1 illustrates an exemplary secure RFID transaction system 100 in accordance with the present invention. In general, system 100 includes an RFID transaction device 102 in RF communication with an RFID reader 104 for transmitting data there between. RFID reader 104 is in further communication with a merchant point-of-sale (POS) device 106 for providing to POS 106 data received from RFID transaction device 102. POS 106 is in further communication with a merchant system 132 for receiving data from the RFID transaction device and providing incentives. Merchant system 132 is in further communication with an acquirer 110 or an account issuer 112 via host network 108. Merchant system 132 transmits a transaction request to acquirer 110 or account issuer 112. The transaction request includes information received from RFID reader 104, RFID transaction device 102 and any information from merchant system 132 concerning the transaction. In sending the transaction request, merchant system 132 requests authorization that the transaction is to be approved or denied. In response, acquirer 110 or account issuer 112 provides merchant system 132 with the authorization necessary for transaction completion.

Although the point-of-interaction (POI) device is described with respect to a merchant point-of-sale (POS) device, the invention is not to be so limited. Indeed, a merchant POS device is used by way of example. Thus, the point-of-interaction device includes any device capable of receiving transaction device 102 account data or data from RFID reader 104. In this regard, the POS includes any point-of-interaction device enabling the user to complete a transaction using transaction device 102. POS device 106 receives RFID transaction device 102 information and provides the information to merchant system 132 for processing.

As used herein, an "acquirer" is any software, hardware, and/or entity including various databases and processors for facilitating the routing of the transaction request to an appropriate account issuer 112. Acquirer 110 routes the request to account issuer 112 in accordance with a routing number provided by RFID transaction device 102. The "routing number" in this context is a unique network address or any similar device for locating an account issuer 112 on host network 108. Traditional means of routing the payment request in accordance with the routing number are well understood. As such, the process for using a routing number to provide the payment request will not be discussed herein for brevity.

Additionally, account issuer ("account provider" or "issuer system") 112 includes any software, hardware, and/or entity which provides a transaction account for facilitating completion of a transaction request. The transaction account includes any charge, credit, debit, loyalty, direct debit, checking, savings, financial or other account. The term "issuer" or "account provider" also refers to any software, hardware, and/or entity facilitating payment of a transaction using a transaction device, and which includes systems permitting payment using at least one of a preloaded and non-preloaded transaction device. Typical issuers include American Express, MasterCard, Visa, Discover, and the like. In the preloaded value processing context, an exchange value (e.g., money, rewards points, barter points, etc.) is stored in a preloaded value database (not shown) for use in completing a requested transaction. The preloaded value database, and thus the exchange value, may not be stored on transaction device itself, but is stored remotely, such as, for example, at account issuer 112 location. Further, the preloaded value database is debited the amount of the transaction requiring the value to be replenished. The preloaded value includes any conventional value (e.g., monetary, currency units, rewards points, barter points, etc.) which is exchanged for goods or services. In that regard, the preloaded value has any configuration as determined by issuer system 112.

In general, during operation of secure system 100, RFID reader 104 provides an interrogation signal via antenna 130 to transaction device 102 for powering transaction device 102 and receiving transaction device 102 related data. The interrogation signal is received at a transaction device antenna 120 and is further provided to a transponder (not shown). In response, a transaction device processor 114 retrieves a transaction device identifier from a transaction device database 116 for providing to RFID reader 104. RFID reader 104 receives the transaction device identifier at antenna 130. RFID reader processor 122 is provided the transaction device identifier and processes it.

As noted, transaction account issuers are continually seeking new ways to secure an RFID transaction. In accordance with the present invention, an RFID transaction is secured using an unpredictable number (UN). In one embodiment, the UN is generated by RFID reader 104 and used by transaction device 102 as one of the data elements that is an input to the calculation of a cryptogram calculated by transaction device 102 and sent in the authorization message. For more information on calculating cryptograms, see U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004, and U.S. patent application Ser. No. 10/905,005, entitled "SYSTEM AND METHOD FOR AUTHENTICATING A RF TRANSACTION USING A RADIO FREQUENCY IDENTIFICATION DEVICE INCLUDING A TRANSACTIONS COUNTER," filed Dec. 9, 2004, both of which are incorporated herein by reference.

Use of a UN in the calculation of the cryptogram prevents or restricts an unauthorized person from stealing a copy of a transaction and sending this transaction to issuer 112 because the reader generates a random value for the UN and it is nearly impossible to predict the value of the UN to be used for each transaction. The unpredictable number, in one embodiment, is generated using a seeded algorithm. The algorithm is a pseudo random number generator. In another embodiment, the time clock on the reader or POS terminal, which is in seconds, milliseconds, and/or any other time frame, is used. In yet another embodiment, the algorithm is seeded with the transaction value in cents concatenated with the time in milliseconds (or any other time increment) and/or any other changing numerical value that can be used to seed the algorithm.

Figure 4:
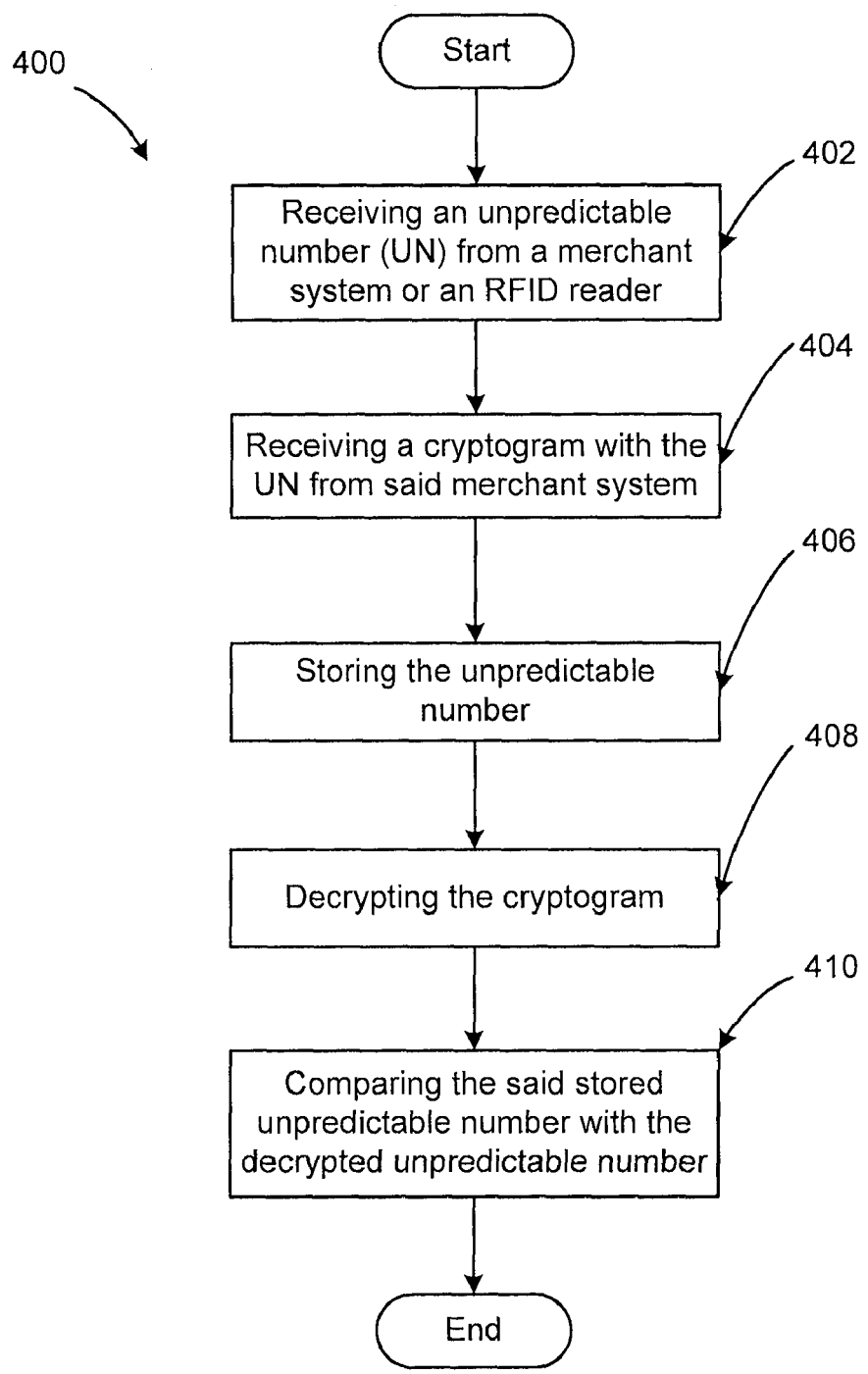
FIG. 4 is a block diagram of an exemplary method for using an unpredictable number in a cryptogram in accordance with an embodiment of the present invention.
Figure 5:
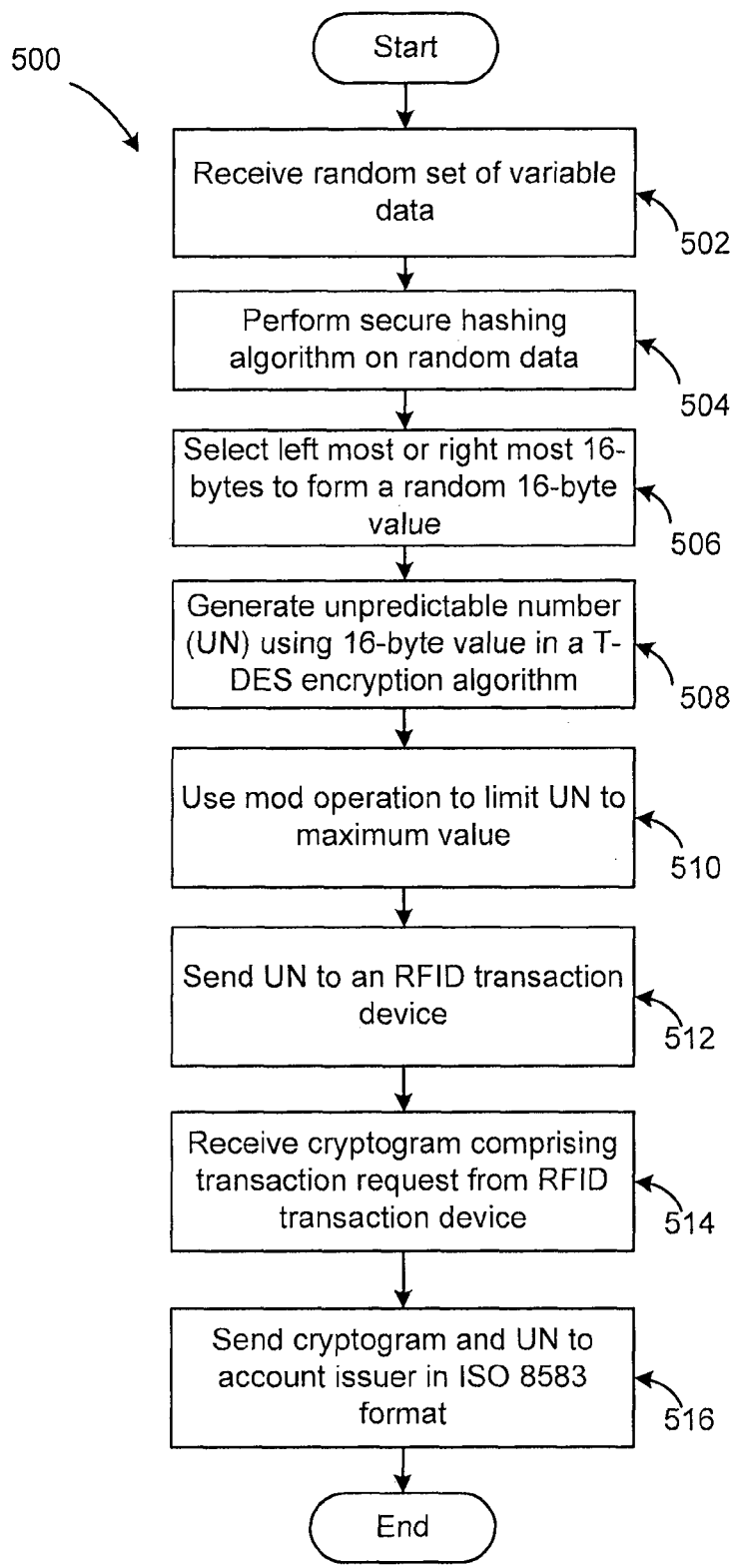
FIG. 5 is a block diagram of an exemplary method for using an unpredictable number in a cryptogram to encrypt a transaction request in accordance with an embodiment of the present invention.

An exemplary use of the UN in the cryptogram is accomplished as follows: RFID reader 104 sends a UN to transaction device 102 at, for example, the start of a payment transaction. Transaction device 102 encrypts the UN together with other information (a transaction counter and a user identifier) using a secret key and sends the transaction to RFID reader 104. The process continues as illustrated in FIG. 4, RFID reader 104 sends the encrypted data (called a cryptogram) and a copy of the UN to account issuer 112 (e.g., in a magnetic stripe format using the ISO 8583 financial message) (Steps 402 and 404), wherein account issuer 112 stores the UN (Step 406), checks that the cryptogram is valid, decrypts the cryptogram (Step 408) and checks that the cryptogram contains an encrypted form of the UN sent by RFID reader 104 (Step 410). If the values are all valid, the transaction is known to have been generated by a transaction device issued by issuer 112 and that it has not been tampered with. Note that the secret key is loaded onto transaction device 102 by issuer 112 when transaction device 102 is created using standard industry secure methods for key management.

Figure 2:
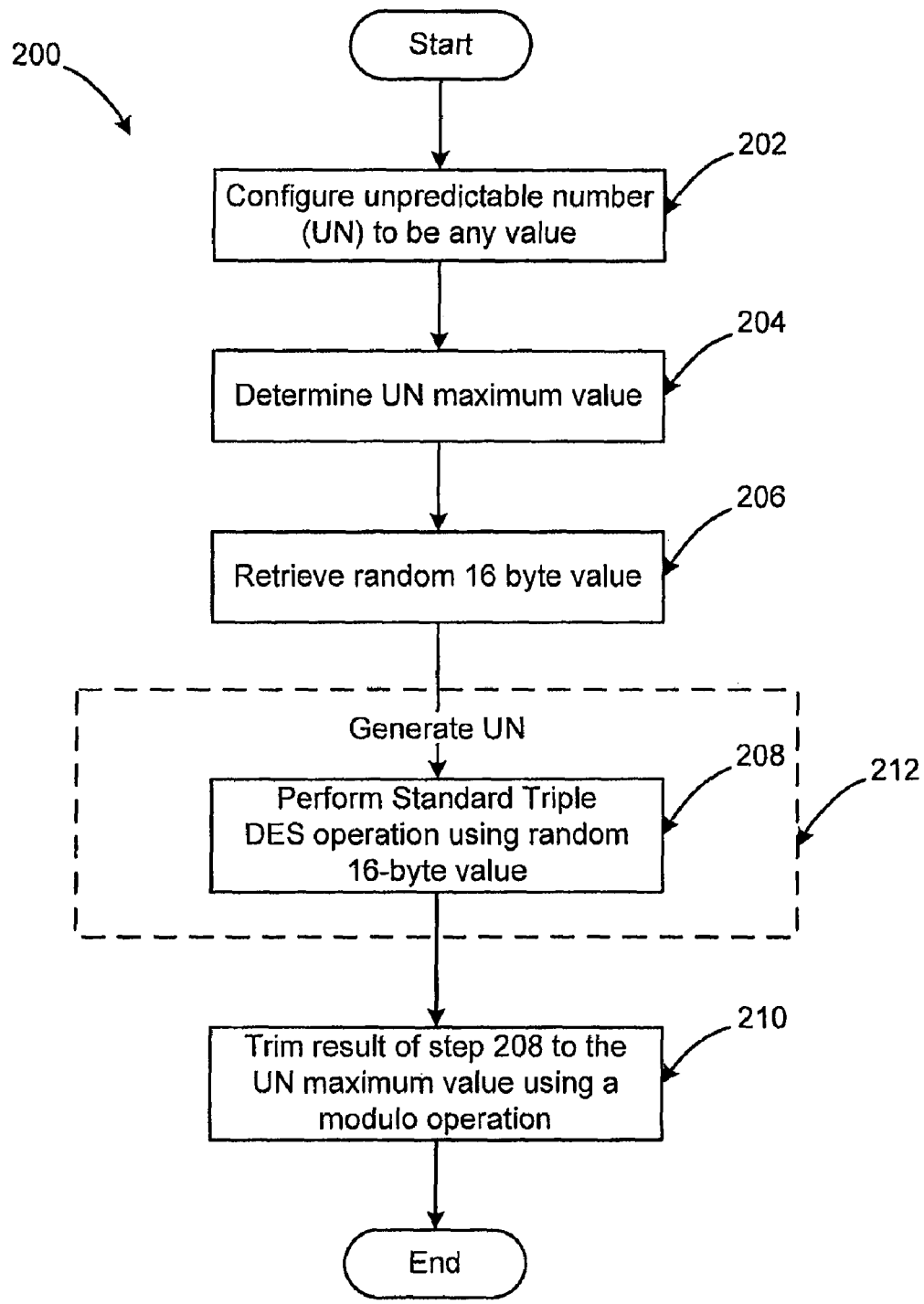
FIG. 2 is a block diagram of an exemplary method for a seeded algorithm in accordance with an embodiment of the present invention.

FIG. 2 depicts an exemplary method 200 of a suitable algorithm in accordance with the present invention. The algorithm is processed using RFID processor 122. Method 200 includes seeding a pseudo random number generator with the unpredictable number generated in accordance with the invention.

Two parties communicating using the present invention may decide that the resulting unpredictable number may have any value (step 202). For example, the sending party (e.g., merchant system 132) and the receiving party (e.g., account issuer 112) may determine that the unpredictable number may have a value range of 0 to 64000. The strength of the security is improved with a larger value for the UN. For example if the range is 0-7, then there is a 1 in 8 chance that someone could 'guess' the correct value of the UN and compromise the security of the transaction. For example, if the range is 1-64000, then the chances for 'guessing' the value is much reduced because it is a 1 in 64000 chance that the guess is correct.

The algorithm of method 200 then uses the predetermined value of the unpredictable number to determine the maximum value of the resulting unpredictable number (step 204). For example, the maximum value of the UN is selected based on the available space in the message sent to issuer 112. This limitation is based on, for example, the space in track 1 or 2 of the magnetic stripe format used for financial transactions. The limitation may also be based on the use of predefined optional fields in the ISO 8583 message sent to the issuer and in this case, larger values are used. The final selection of the maximum value is a compromise between the available space in the magnetic stripe format (or the ISO8583 format) which limits the size, and the desired maximum value to make it difficult to predict the UN. The largest size that can be used on the network is normally selected to maximize the strength of the security. The algorithm is then seeded with a seed value generated in accordance with the method of FIG. 3.

Figure 3:
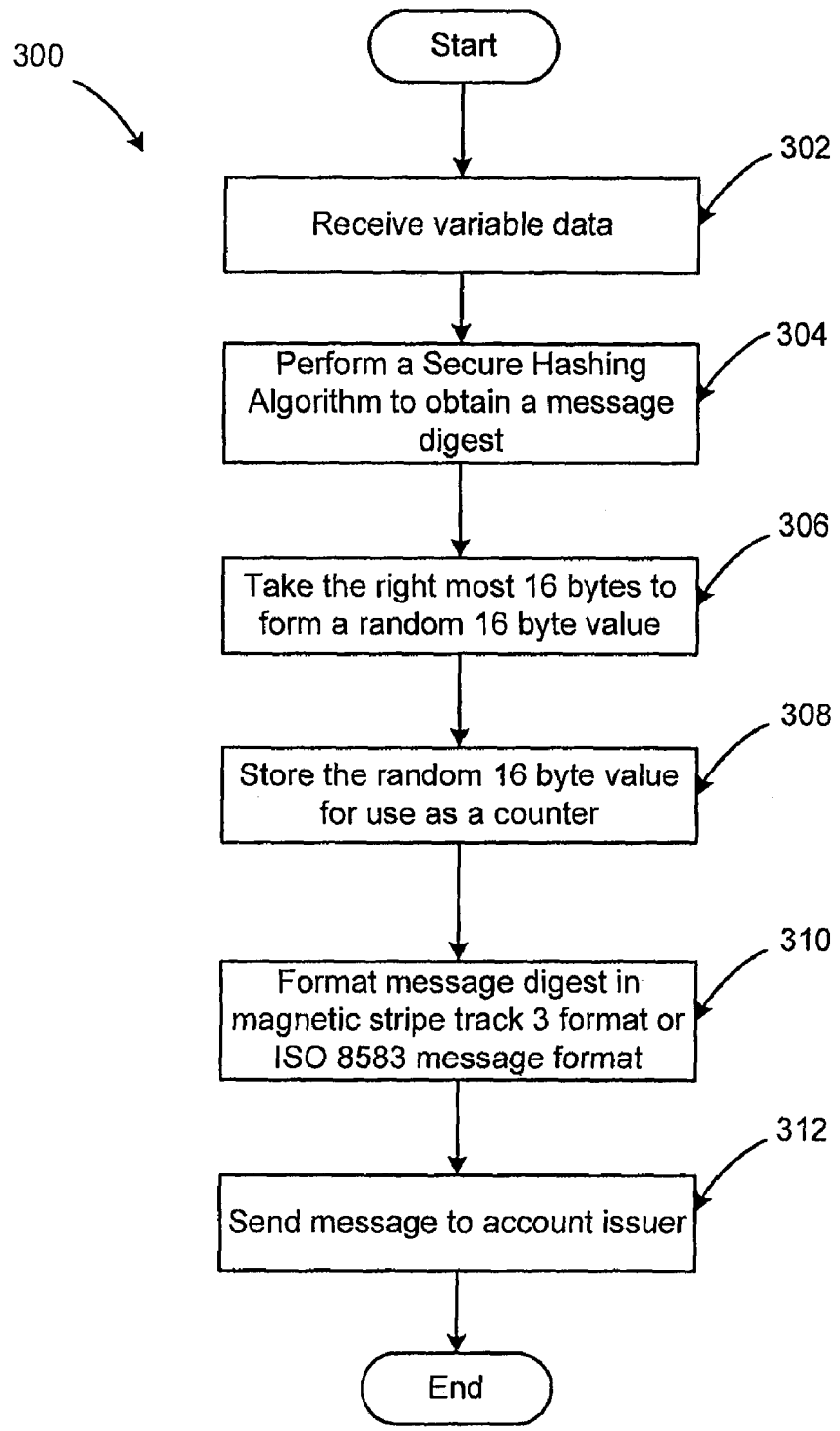
FIG. 3 is a block diagram of an exemplary method for generating a random counter value in accordance with an embodiment of the present invention.

With brief reference to FIG. 3, an exemplary method 300 of generating the seed value according to this invention is described. In one exemplary embodiment, RFID processor 122 receives variable data from RFID transaction device 102 for use in generating the seed value and running the algorithm illustrated by method 200 (step 302). The variable data includes any data related to RFID transaction device 102, RFID reader 104 or the transaction requested. For example, the variable data is an RFID reader 104 identifier, a counter value provided by RFID reader 104 or RFID transaction device 102, the time of the transaction, a secret password or phrase related to RFID transaction device 102, an RFID transaction device identifier, non-RFID readers and/or transaction device identifiers and/or data, PIN data, loyalty data, inventory data, storage data, financial data, user data, and the number of milliseconds since the RFID reader 104 has processed the most recent transaction.

RFID processor 122 then performs a secure hashing algorithm on the variable data to obtain an output called a "message digest" (step 304). RFID processor 122 performs suitable secure hashing algorithms that include, for example, any secure hashing algorithm defined by the Federal Information Processing Standard Publication 180-1, incorporated herein by reference. For example, Secure Hashing Algorithm SHA-1 is an exemplary algorithm that is useful with this invention.

In one exemplary embodiment, the message digest generated by RFID processor 122 includes 160-bits (20-bytes). RFID processor 122 truncates the message digest into a 16-byte format. In one exemplary embodiment, RFID processor 122 truncates the message digest so that only the right most (or left most) 16 bytes of the message digest remain (step 306). Processor 122 then provides the 16-byte value to a RFID database 128 for storage and/or later use as a counter value in the algorithm describe in FIG. 2 (step 308). In one embodiment, RFID formats the message digest into either magnetic stripe track 1 format or ISO 8583 format (step 310) and sends the message to the account issuer.

Returning now to FIG. 2, RFID processor 122 retrieves the 16-byte value (e.g., counter value) from database 128 (step 206). RFID processor 122 then uses the counter value to seed the algorithm for use in generating the unpredictable number (step 212). For example, RFID processor 122 retrieves the counter value and uses the value in a pseudo number generator to generate the unpredictable number using a Data Encryption Standard (step 208). Exemplary Data Encryption Standards (DES) which are used are those described in Federal Information Processing Standards (FIPS) Publication 46-3, incorporated herein by reference. In this way, RFID processor 122 creates a random number using the unpredictable number generated by the pseudo number generator. A range of values for the unpredictable number can be chosen, and the maximum value permitted for the unpredictable number is determined.

In an exemplary embodiment, the sender or receiver may wish to trim the unpredictable number to the maximum value allowed (step 210). Trimming of the maximum number is used because of limitations in the available space in a message. The message can be a magnetic stripe formatted message (track 1, 2 or 3) or a suitable field in the ISO8583 message used to send financial transactions to issuer 112. For example, in one embodiment, RFID processor 122 uses a modification function to trim the unpredictable number as predetermined by merchant system 132 and/or account issuer 112.

Although an embodiment of the invention includes generating an unpredictable number at RFID reader 104, the invention is not so limited. The unpredictable number is generated and/or regenerated by any one of the computing systems in the transaction stream. For example, the unpredictable number is generated by computing systems at the account issuer 112, acquirer 110, the receiver, or merchant system 132 locations. Moreover, the algorithm described herein is used in any environment wherein security of a transaction is required.

The system may include an application server, host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers.

Similarly, the software elements of the present invention can be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention employs any number of conventional techniques for communicating data, data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The term "communication" refers to a signal that travels to/from one component to another. The components are directly connected to each other or are connected through one or more other devices or components. The various coupling components for the devices can include but are not limited to the Internet, a wireless network, a conventional wire cable, an optical cable or connection through air, water, or any other medium that conducts signals, and any other coupling device or medium. A variety of conventional communications media and protocols are used for data links between components. For example, the data links include an Internet Service Provider (ISP) configured to facilitate communications over a local loop as is typically used in connection with standard modem communication, cable modem, dish networks, ISDN, Digital Subscriber Lines (DSL), or any wireless communication media. In addition, a merchant system according to this invention includes a POS device and host network. The merchant system may reside on a local area network which interfaces to a remote network for remote authorization of an intended transaction. The merchant system communicates with the remote network via a leased line, such as a T1, D3 line, or the like. Such communications lines are described in a variety of texts, such as, "Understanding Data Communications," by Gilbert Held, which is incorporated herein by reference.

Certain communications between the parties and the system of the present invention are accomplished through any suitable communication means, such as, for example, a telephone network, intranet, Internet, point-of-interaction device (point-of-sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

Where required, the system user communicates with a system via any input device such as, a keypad, keyboard, mouse, kiosk, personal digital assistant, handheld computer (e.g., Palm Pilot®, Blackberry®), cellular phone and/or the like). Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

It should be further noted that the transfer of information in accordance with this invention, is done in a format recognizable by a merchant system or account issuer. In that regard, by way of example, the information is transmitted in magnetic stripe or multi-track magnetic stripe format. Because of the proliferation of devices using magnetic stripe format, the standards for coding information in magnetic stripe format were standardized by the International Standards Organization (ISO).

Typically, magnetic stripe information is formatted in three tracks. Certain industry information must be maintained on certain portion of the tracks, while other portions of the tracks may have open data fields. The contents of each track and the formatting of the information provided to each track is controlled by ISO standard ISO/IEC 7811. For example, the information must typically be encoded in binary. Track 1 is usually encoded with user information (name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, currency units, amount authorized per cycle, subsidiary accounts, and restrictions.

As such, where information is provided in accordance with this invention, it is provided in magnetic stripe format track. For example, counter values, authentication tags and encrypted identifiers, described herein, is forwarded encoded in all or a portion of a data stream representing data encoded in, for example, track 2 or track 3 format.

An RFID transaction device identifier, as used herein, may include an identifier for a transaction device which is correlated to a user transaction account (e.g., credit, charge debit, checking, savings, reward, loyalty, or the like) maintained by a transaction account provider (e.g., payment authorization center). A typical transaction account identifier (e.g., account number) is correlated to a charge, credit or debit account, loyalty account, or rewards account maintained and serviced by such entities as American Express, Visa and/or MasterCard, or the like.

In that regard, the transaction device identifier discussed herein may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number is stored as Track 1 and Track 2 data as defined in ISO/IEC 7813, and is unique to RFID transaction device.

In one exemplary embodiment, the transaction device identifier may include a unique RFID transaction device serial number and user identification number, as well as specific application applets. In another embodiment, the transaction device identifier may include a marker that facilitates recognition of the transaction device identifier as originating with an RFID device. The transaction device identifier is stored on a transaction device database located on the transaction device. Additionally, the RFID device may include a transaction device database configured to store multiple account numbers issued to an RFID transaction device user by the same or different account providing institutions. In addition, where the transaction device identifier corresponds to a loyalty or rewards account, a merchant system database is configured to store the attendant loyalty or rewards points data in associated relationship with the RFID transaction device identifier.

In addition to the above, the transaction device identifier is associated with any secondary form of identification configured to allow the consumer to interact or communicate with a payment system. For example, the transaction device identifier is associated with, an authorization/access code, personal identification number (PIN), Internet code, digital certificate, biometric data, and/or other secondary identification data used to verify a transaction device user identity.

Databases discussed herein is a graphical, hierarchical, relational, object-oriented or other database, and is maintained on a local drive of a server or on a separate computer coupled to the server via a local area or other network (not shown). In one embodiment, databases disclosed are a collection of ASCII or other text files stored on a local drive of a server. Database information is suitably retrieved from the database and provided to transaction processing systems upon request via a server application, as described more fully below.

Further still, various components are described herein in terms of their "validity." In this context, a "valid" component is one which is authorized for use in completing a transaction request in accordance with the present invention. Contrarily, an "invalid" component is one which is not authorized for transaction completion. In addition, an invalid component is one which is not recognized as being permitted for use on the secure RF system described herein.

It should be noted that conventional components of RFID transaction devices may not be discussed herein for brevity. For instance, one skilled in the art will appreciate that RFID transaction device and RFID reader disclosed herein include traditional transponders, antennas, protocol sequence controllers, modulators/demodulators and the like, necessary for proper RFID data transmission. As such, those components are contemplated to be included in the scope of the invention. For a more detailed description of the operation of RFID transaction devices and RFID readers please refer to commonly-owned U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, and its progeny, all incorporated by reference in their entirety.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method for generating an unpredictable number to facilitate securing a transaction:

obtaining, by an Radio Frequency Identification (RFID) reader, variable data;

performing, by said RFID reader, a secure hashing algorithm on said variable data to produce a message digest, wherein the secure hashing algorithm is configured to produce a digest of at least 16 bytes;

selecting, by said RFID reader, at least one of a left-most 16 bytes or a right-most 16 bytes of said message digest to form a random 16-byte value;

creating, by said RFID reader, said unpredictable number using said random 16-byte value as an input for a seeded pseudo-random number generator;

determining, by said RFID reader and based upon at least one of an account issuer or a merchant system, a proposed maximum value for said unpredictable number;

truncating, by said RFID reader, said unpredictable number, wherein the result of said truncating is said unpredictable number limited to said proposed maximum value;

sending, by said RFID reader, the truncated unpredictable number to an RFID transaction device;

receiving, by said RFID reader, a cryptogram from said RFID transaction device, wherein said cryptogram includes the truncated unpredictable number; and sending, by said RFID reader, the truncated unpredictable number and said cryptogram to an account issuer, wherein said account issuer validates said cryptogram and verifies that said cryptogram includes the truncated unpredictable number.

2. The method of claim 1, wherein said obtaining said variable data includes receiving at least one of an RFID transaction device identifier, RFID transaction device data, an RFID reader identifier, RFID reader data, transaction request data, a counter value provided by said RFID reader, a counter value provided by said RFID transaction device, a time of said transaction, a password related to said RFID transaction device, non-RFID transaction device data, non-RFID reader data, PIN data, loyalty data, inventory data, storage data, financial data, user data, or a number of milliseconds since said RFID reader has processed a most recent transaction.

3. The method of claim 2, wherein said seeded pseudo-random number generator comprises a triple Data Encryption Standard (DES) operation.

4. The method of claim 3, wherein said performing said secure hashing algorithm on said variable data to produce said message digest comprises formatting said message in at least one of magnetic strip format, track 1 format, track 2 format, or track 3 format.

5. The method of claim 4, wherein said sending said cryptogram and the truncated unpredictable number to said account issuer comprises sending in a magnetic stripe format using an ISO 8583 message.

6. The method of claim 5, wherein said performing said secure hashing algorithm on said variable data comprises using a Radio Frequency Identification (RFID) processor to perform said secure hashing algorithm.

7. The method of claim 6, wherein said performing said secure hashing algorithm on said random set of variable data comprises using Secure Hashing Algorithm SHA-1.

8. A tangible computer-readable medium having stored thereon a plurality of non-transitory computer executable instructions, the plurality of instructions when executed by an RFID reader cause said RFID reader to perform the method comprising:

obtaining variable data;

performing a secure hashing algorithm on said variable data to produce a message digest, wherein the secure hashing algorithm is configured to produce a digest of at least 16 bytes;

selecting at least one of a left-most 16 bytes or a right-most 16 bytes of said message digest to form a random 16-byte value;

creating said unpredictable number using said random 16-byte value as an input for a seeded pseudo-random number generator;

determining, based upon at least one of an account issuer or a merchant system, a proposed maximum value for said unpredictable number;

truncating said unpredictable number, wherein the result of said truncating is said unpredictable number limited to said proposed maximum value;

sending the truncated unpredictable number to an RFID transaction device;

receiving a cryptogram from said RFID transaction device, wherein said cryptogram includes the truncated unpredictable number; and sending the truncated unpredictable number and said cryptogram to an account issuer, wherein said account issuer validates said cryptogram and verifies that said cryptogram includes the truncated unpredictable number.

9. The computer-readable medium of claim 8, wherein said seeded algorithm is a triple Data Encryption Standard (DES) operation.

* * * * *

UNITED STATES PATENT AND TRADEMARK OFFICE
CERTIFICATE OF CORRECTION

| | | |
|---|---|---|
| PATENT NO. | : 8,001,054 B1 | Page 1 of 1 |
| APPLICATION NO. | : 11/306617 | |
| DATED | : August 16, 2011 | |
| INVENTOR(S) | : Lee J. Peart et al. | |

It is certified that error appears in the above-identified patent and that said Letters Patent is hereby corrected as shown below:

On the Title page, section (63) Related U.S. Application Data, after Mar. 10, 2004, please delete "which" and insert therefor --and--.

On the Title page, section (63) Related U.S. Application Data, after Jan. 10, 2003, please delete "which" and insert therefor --and--.

Signed and Sealed this
Twenty-seventh Day of September, 2011

David J. Kappos
*Director of the United States Patent and Trademark Office*